(12) United States Patent
Matsumoto et al.

(10) Patent No.: US 9,772,484 B2
(45) Date of Patent: Sep. 26, 2017

(54) LIGHT MODULATING DEVICE

(71) Applicant: CITIZEN WATCH CO., LTD., Tokyo (JP)

(72) Inventors: Kenji Matsumoto, Tokyo (JP);
Nobuyuki Hashimoto, Saitama (JP);
Makoto Kurihara, Saitama (JP);
Masafumi Yokoyama, Tokyo (JP);
Ayano Tanabe, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 14/647,403

(22) PCT Filed: Nov. 5, 2013

(86) PCT No.: PCT/JP2013/079919
§ 371 (c)(1),
(2) Date: May 26, 2015

(87) PCT Pub. No.: WO2014/084007
PCT Pub. Date: Jun. 5, 2014

(65) Prior Publication Data
US 2015/0338631 A1      Nov. 26, 2015

(30) Foreign Application Priority Data
Nov. 29, 2012    (JP) .................................. 2012-261599

(51) Int. Cl.
*G02B 21/36*    (2006.01)
*G02B 27/42*    (2006.01)
(Continued)

(52) U.S. Cl.
CPC ......... *G02B 21/361* (2013.01); *G02B 5/1871* (2013.01); *G02B 21/082* (2013.01);
(Continued)

(58) Field of Classification Search
CPC .. G02B 21/0004; G02B 21/14; G02B 21/361; G02B 21/06; G02B 21/082; G02B 5/18;
(Continued)

(56) References Cited

U.S. PATENT DOCUMENTS

2009/0296205 A1    12/2009  Ouchi
2010/0157422 A1     6/2010  Ouchi et al.
(Continued)

FOREIGN PATENT DOCUMENTS

DE    102007047466 A1    4/2009
JP    2006-268004 A      10/2006
(Continued)

OTHER PUBLICATIONS

English translation of JP 2006268004, machine translated on May 25, 2016.*
(Continued)

*Primary Examiner* — Jie Lei

(57) ABSTRACT

A light modulating device 103 includes: a selective diffraction device (10, 10') which generates diffracted light beams of a plurality of orders by diffracting illumination light into one of a plurality of directions, the illumination light being linearly polarized light having a polarization plane oriented in a first polarization direction, and which causes a phase difference between the diffracted light beams of the plurality of orders; and a polarization plane rotating device 14 which rotates the polarization plane of the diffracted light beam of each order so as to be oriented in a direction perpendicular to a direction radiating from an optical axis.

6 Claims, 11 Drawing Sheets

(51) Int. Cl.

| | |
|---|---|
| *G02F 1/1333* | (2006.01) |
| *G02B 21/08* | (2006.01) |
| *G02B 5/18* | (2006.01) |
| *G02F 1/1343* | (2006.01) |
| *G02F 1/1335* | (2006.01) |
| *G02F 1/13363* | (2006.01) |
| *G02F 1/1347* | (2006.01) |
| *G02B 27/28* | (2006.01) |
| *G02B 27/58* | (2006.01) |
| *G02B 26/06* | (2006.01) |
| *G02B 27/10* | (2006.01) |
| *G02B 27/60* | (2006.01) |

(52) U.S. Cl.
CPC ....... *G02B 27/286* (2013.01); *G02B 27/4205* (2013.01); *G02B 27/425* (2013.01); *G02B 27/58* (2013.01); *G02F 1/1333* (2013.01); *G02F 1/1335* (2013.01); *G02F 1/1347* (2013.01); *G02F 1/13363* (2013.01); *G02F 1/134309* (2013.01); *G02B 26/06* (2013.01); *G02B 27/1086* (2013.01); *G02B 27/60* (2013.01); *G02F 2203/50* (2013.01)

(58) Field of Classification Search
CPC .......... G02B 5/30; G02B 5/871; G02B 27/46; G02B 27/27; G02B 27/4205; G02B 27/425; G02B 6/2766; G02B 21/36; G02B 27/42; G02B 27/06; G02B 27/58; G02B 27/286; G02B 27/60; G02B 27/1086; G02F 1/13363; G02F 1/1335; G02F 1/1347; G02F 1/1333; G02F 1/134309; G02F 1/1393; G02F 1/29; G02F 1/03; G02F 1/07; G02F 1/09; G02F 1/0316; G02F 1/0322; G02F 1/1521; G02F 1/0356; G02F 2203/50; B82Y 20/00; G01B 9/02; G09G 3/3629
USPC ....... 359/316, 370, 385, 386, 245, 251, 253, 359/254, 259, 272, 279, 282, 301, 322, 359/563, 566, 569; 349/33, 34, 41; 356/491, 492, 495
See application file for complete search history.

(56) References Cited

U.S. PATENT DOCUMENTS

| | | | |
|---|---|---|---|
| 2012/0026311 A1 | 2/2012 | Ouchi et al. | |
| 2012/0026417 A1 | 2/2012 | Yamamoto et al. | |
| 2012/0314147 A1 | 12/2012 | Sato et al. | |
| 2013/0342768 A1 | 12/2013 | Yokoyama et al. | |
| 2014/0104407 A1 | 4/2014 | Ouchi | |

FOREIGN PATENT DOCUMENTS

| | | |
|---|---|---|
| WO | 2008/132976 A1 | 11/2008 |
| WO | 2009/031418 A1 | 3/2009 |
| WO | 2011/105618 A1 | 9/2011 |
| WO | 2011/135819 A1 | 11/2011 |
| WO | 2012/124634 A1 | 9/2012 |
| WO | 2013/001805 A1 | 1/2013 |

OTHER PUBLICATIONS

M. Stalder et al "Linearly polarized light with axial symmetry generated by liquid-crystal polarization converters", Optics Letters/ vol. 21, No. 23/Dec. 1, 1996; p. 1948-1950.*
Written Opinion of the International Searching Authority for PCT/JP2013/079919, Jan. 21, 2014.
Oouchi, "Super-resolution microscope N-SIM using structured illumination", O Plus E, Sep. 2012, pp. 827-833, vol. 34, No. 9, Adcom Media, 2012.
International Search Report for PCT/JP2013/079919, Jan. 21, 2014.
European Paten Office, Extended Search Report for EP patent application No. 13859483.3, Jun. 24, 2016.
Japan Patent Office, Office Action for Japanese patent application No. 2014-550101, Jan. 10, 2017.

* cited by examiner

LIGHT MODULATING DEVICE

TECHNICAL FIELD

The present invention relates to a light modulating device for use in an illuminating apparatus that illuminates an object with structured illumination light.

BACKGROUND ART

Recent years have seen the development of a microscope apparatus that projects interference fringes as structured illumination light onto a specimen and that makes it possible to analyze the structure of the specimen at a resolution higher than the resolution limit of the objective lens by analyzing images captured of moiré fringes arising due to the interference fringes and the structure of the specimen (for example, refer to patent documents 1 and 2 and non-patent document 1 cited below).

In the microscope apparatus according to the prior art, light from a light source is diffracted into three different directions, from among which a pair of +1st order and −1st order diffracted light beams diffracted in one direction is selected using a shutter, and after converting each beam to S-polarized light, the beams are made to interfere with each other on the specimen, thus forming interference fringes on the specimen. Then, a plurality of image capturing operations are performed while varying the phase difference between the +1st order diffracted light beam and the −1st order diffracted light beam on the specimen, and the images of the moiré fringes are analyzed to obtain a super-resolution image of the specimen with a resolution higher than the resolution limit of the objective lens.

PRIOR ART DOCUMENTS

Patent Documents

[Patent Document 1] Japanese Laid-open Patent Publication No. 2006-268004
[Patent Document 2] International Publication Pamphlet No. WO2009/031418

Non-Patent Documents

[Non-patent Document 1] Oouchi, "Super-resolution microscope N-SIM using structured illumination," O PLUS E, Adcom Media, Vol. 34, No. 9, pp. 827-833, 2012

In the microscope apparatus as above described, a disc-shaped phase plate, which is, for example, constructed so that the optical path length for a beam of light varies depending on the region through which the beam of light passes, is used in order to adjust the phase difference between the +1st order diffracted light beam and the −1st order diffracted light beam. Then, by rotating the phase plate about the optical axis, a predetermined phase difference is provided to one of the 1st order light pairs selected from among the three directions. Alternatively, by adjusting the tilt angle of a mirror provided to reflect the +1st order and −1st order diffracted light beams toward the specimen, the phase difference between the +1st order diffracted light beam and the −1st order diffracted light beam is adjusted.

In this way, the microscope employs a mechanically operated device in order to adjust the phase difference between the +1st order diffracted light beam and the −1st order diffracted light beam. There is therefore a need to precisely control the operation of the device in order to set the phase difference between the +1st order diffracted light beam and the −1st order diffracted light beam to a predetermined value. A mechanically operated device is also employed in order to control the shutter for selecting the diffracted light diffracted in a specific direction and to adjust the polarization direction of the diffracted light incident on the specimen. In the case of such mechanically operated devices, it takes time from the moment the operation of the device is started until the device is brought into its stable rest position. Since a plurality of image capturing operations need to be performed while varying the direction of the diffracted light or the phase difference between the diffracted light beams in order to generate a super-resolution image, as described above, the length of time taken to operate such mechanical devices has led to an increase in the time necessary to generate the super-resolution image.

Accordingly, it is an object of the present invention to provide a light modulating device that can adjust the polarization direction and the phase of structured illumination light without using any mechanically operated components.

Means for Solving the Problem

According to one aspect of the present invention, a light modulating device is provided. The light modulating device includes: a selective diffraction device which generates diffracted light beams of a plurality of orders by diffracting illumination light into one of a plurality of directions, the illumination light being linearly polarized light having a polarization plane oriented in a first polarization direction, and which causes a phase difference between the diffracted light beams of the plurality of orders; and a polarization plane rotating device which rotates the polarization plane of the diffracted light beams of the plurality orders to be oriented in a direction perpendicular to a direction radiating from an optical axis.

Preferably, in the light modulating device, the selective diffraction device includes a liquid crystal layer on which the illumination light is incident, and a phase difference is caused between the diffracted light beams of the plurality of orders while passing through the liquid crystal layer.

Preferably, in the light modulating device, the selective diffraction device includes a spatial light modulating device which displays a diffraction grating for diffracting the illumination light into a selected one of the plurality of directions and for causing a phase difference between the diffracted light beams of the plurality of orders.

Preferably, in the light modulating device, the selective diffraction device further includes a shutter device whose light-transmitting region is divided into a plurality of sub-regions through which the diffracted light beams of the plurality of orders diffracted in the plurality of directions respectively pass, and the shutter device attenuates light passing through any other sub-region than the sub-regions through which the diffracted light beams of the plurality of orders diffracted in the selected one of the plurality of directions respectively pass.

Preferably, in the light modulating device, the selective diffraction device alternatively includes: a diffractive device which diffracts the illumination light into the plurality of directions; a shutter device through which the diffracted light beams of the plurality of orders diffracted in the one of the plurality of directions are allowed to pass; and a phase modulating device which includes at least one first liquid crystal device for causing a phase difference between the diffracted light beams of the plurality of orders passed through the shutter device.

In light modulating device, the at least one first liquid crystal device in the phase modulating device includes a first liquid crystal layer which contains liquid crystal molecules aligned in parallel with the polarization direction of the diffracted light beams of the plurality of orders passed through the shutter device, wherein a phase difference proportional to a difference between a first voltage applied to a first sub-region of the first liquid crystal layer through which a diffracted light beam of a first order among the diffracted light beams of the plurality of orders passes and a second voltage applied to a second sub-region of the first liquid crystal layer through which a diffracted light beam of a second order among the diffracted light beams of the plurality of orders passes is caused between the diffracted light beam of the first order and the diffracted light beam of the second order.

Preferably, in the light modulating device, the phase modulating device includes two liquid crystal devices, each as the first liquid crystal device, which are arranged along the optical axis, wherein the first liquid crystal layer in each of the two first liquid crystal devices is chosen to have a thickness such that a maximum value of an optical path length difference that occurs between the diffracted light beam of the first order and the diffracted light beam of the second order while passing through the first liquid crystal layer is less than the wavelength of the illumination light.

Preferably, in the light modulating device, the shutter device includes: a second liquid crystal device which includes a second liquid crystal layer which contains liquid crystal molecules aligned in a direction that bisects an angle that the first polarization direction makes with a second polarization direction; and an analyzer which is disposed nearer the phase modulating device than the second liquid crystal device is, and which allows linearly polarized light having a polarization plane oriented in the second polarization direction to pass through, while blocking linearly polarized light having a polarization plane oriented in a direction other than the second polarization direction.

Preferably, in this case, when a predetermined voltage proportional to the wavelength of the illumination light is applied across a sub-region of the second liquid crystal layer through which the diffracted light beams of the plurality of orders diffracted in one of the plurality of directions pass, the polarization plane of the diffracted light beams passing through the sub-region is rotated to be oriented in parallel to the second polarization direction, thereby allowing the diffracted light beams of the plurality of orders diffracted in the one direction to pass through the shutter device.

Further preferably, in the light modulating device, the polarization plane rotating device includes a third liquid crystal device which includes a third liquid crystal layer which contains liquid crystal molecules aligned in a direction that bisects an angle that the polarization plane of the diffracted light beams of the plurality of orders passed through the phase modulating device makes with the direction perpendicular to the radiating direction.

Preferably, in this case, when a predetermined voltage proportional to the wavelength of the illumination light is applied across the third liquid crystal layer in the third liquid crystal device, the polarization plane of the diffracted light beams of the plurality of orders passing through the third liquid crystal layer is rotated to be oriented in the direction perpendicular to the radiating direction.

Preferably in the light modulating device, the polarization plane rotating device alternatively includes an azimuth polarization converting device by which linearly polarized light having a polarization plane parallel to the polarization plane of the diffracted light beams of the plurality of orders passed through the phase modulating device is converted into azimuthally polarized light.

Effect of the Invention

The light modulating device according to the present invention offers the effect of being able to adjust the polarization direction and the phase of the structured illumination light without using any mechanically operated components.

MODE FOR CARRYING OUT THE INVENTION

A light modulating device according to embodiments of the present invention will be described below with reference to the drawings. The light modulating device causes linearly polarized illumination light from a light source to be diffracted into three different directions to obtain three sets of diffracted light beams, each set being composed of a +1st order diffracted light beam, a −1st order diffracted light beam, and a 0th order diffracted light beam. In the light modulating device, a shutter device for selecting a set of diffracted light beams to be transmitted therethrough from among the three sets of the +1st order, −1st order, and 0th order diffracted light beams, a phase modulating device for adjusting the phase of each selectively transmitted diffracted light beam, and a polarization plane rotating device for adjusting the orientation of the polarization plane of the −1st order diffracted light beam as well as the selectively transmitted diffracted light beams are each formed from a liquid crystal device in order to eliminate the need for mechanically operated parts.

Figure 1:
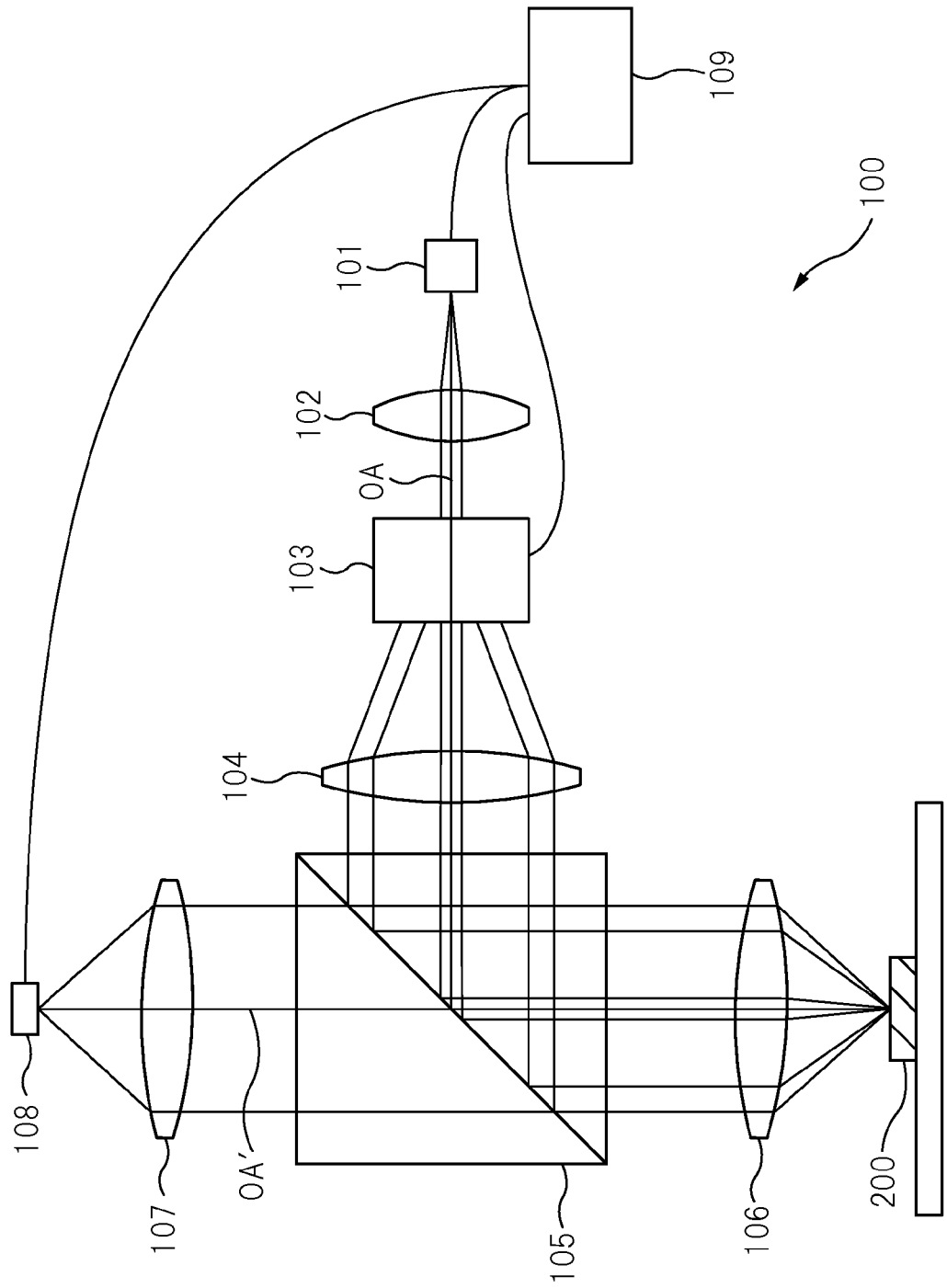
FIG. 1 is a diagram schematically illustrating the configuration of a microscope apparatus using a light modulating device according to an embodiment of the present invention.

FIG. 1 is a diagram schematically illustrating the configuration of a microscope apparatus using a light modulating device according to a first embodiment of the present invention. As illustrated in FIG. 1, the microscope apparatus 100 includes a light source 101, a collimator 102, the light modulating device 103, a collimator 104, a beam splitter 105, an objective lens 106, a condensing lens 107, a light receiving device 108, and a controller 109.

The beam splitter 105, the objective lens 106, the condensing lens 107, and the light receiving device 108 are arranged in a straight line along an optical axis OA' which is defined by the objective lens 106 and condensing lens 107. On the other hand, on one side of the beam splitter 105, there are arranged the light source 101, the collimator 102, the light modulating device 103, and the collimator 104 in a straight line along an optical axis OA which is defined by the collimators 102 and 104 and which extends at right angles to the optical axis OA'. The light source 101, the collimator 102, the light modulating device 103, the collimator 104, the beam splitter 105, and the objective lens 106 together constitute an illuminating apparatus which projects interference fringes as structured illumination light onto an object.

The light source 101 outputs illumination light which is linearly polarized light. For this purpose, the light source 101 includes, for example, a semiconductor laser. Alternatively, the light source 101 may include a gas laser such as an argon ion laser or a solid laser such as a YAG laser. If the illumination light that the light source 101 outputs is not linearly polarized light, an analyzer for converting the illumination light into linearly polarized light may be interposed between the light source 101 and the collimator 102. Further, the light from the light source 101 may be guided, for example, through an optical fiber, to the collimator 102.

Further alternatively, the light source 101 may include a plurality of light-emitting devices that output light at different wavelengths in a predetermined wavelength range. In this case, the light source 101 causes one of the light-emitting devices to emit the illumination light, for example, in accordance with a control signal from the controller 109.

The illumination light emitted as linearly polarized light from the light source 101 is converted by the collimator 102 into a parallel beam of light, and then passed through the light modulating device 103. While passing through the light modulating device 103, the illumination light is separated into diffracted light beams of a plurality of orders polarized in a selected one of a plurality of directions radiating from the optical axis OA. Further, the polarization plane of the diffracted light of each order is rotated circumferentially about the optical axis OA so that it is incident as S-polarized light on the surface of a specimen, and a predetermined phase difference is provided between the diffracted light beams of different orders. At least one of the diffraction direction and the phase difference between the diffracted light beams of different orders is changed each time an image of moiré fringes is shot. Then, the diffracted light beams of different orders are converted into parallel beams of light, are reflected by the beam splitter 105, and are focused as a spot by the objective lens 106 to form interference fringes due to the interference between the diffracted light beams of different orders on an object surface under observation that is set within or on the surface of the specimen 200. The light reflected or scattered by the object surface or the light as fluorescent emission from the object surface is once again passed through the objective lens 106 and then passes straight through the beam splitter 105. After that, the light reflected or scattered by the object surface or the light as fluorescent emission from the object surface is focused through the condensing lens 107 onto the light receiving device 108.

Though not depicted for ease of understanding, the microscope apparatus 100 may include various kinds of compensating optics such as a spherical aberration compensating optic in the optical path or a mirror for deflecting the optical path.

The light receiving device 108 includes a solid-state imaging device constructed, for example, from a plurality of CCDs or CMOS devices arranged in an array, and outputs for each image shot an electrical signal proportional to the intensity of light received by the solid-state imaging device, thereby generating an image of moiré fringes formed on the light receiving device 108 due to the structure of the specimen and the interference fringes projected as the structured illumination light. The light receiving device 108 supplies the moiré fringe image to the controller 109.

The controller 109 includes, for example, a processor, a memory, and an interface circuit for connecting the controller 109 to various units of the microscope apparatus 100. The controller 109 controls the light source 101 and the light modulating device 103. The controller 109 supplies predetermined power to the light source 101 and thereby causes the light source 101 to emit illumination light. When the light source 101 is constructed from a plurality of light-emitting devices, the controller 109 transmits to the light source 101 a control signal for causing one of the plurality of light-emitting devices to emit illumination light in response to a user operation entered via a user interface not depicted.

The controller 109 further includes a driving circuit (not depicted), and controls the voltage to be applied to each liquid crystal device in the light modulating device 103 via the driving circuit, thereby controlling the phase, diffraction direction, etc. of the diffracted light of each order to be output from the light modulating device 103.

In particular, when the light source 101 is constructed from a plurality of light-emitting devices that output light at different wavelengths, the controller 109 adjusts the voltage to be applied to each liquid crystal device in the light modulating device 103 so as to match the light-emitting device to be caused to emit light.

The driving voltage to be applied to each liquid crystal device in the light modulating device 103 via the driving circuit may be, for example, a pulse-height modulated (PHM) or pulse-width modulated (PWM) AC voltage. Further, the driving circuit may "overdrive" each liquid crystal device in the light modulating device 103 in order to enhance the response speed of the liquid crystal device.

The controller 109 generates an image of the object surface of the specimen 200 (for convenience, hereinafter referred to as the specimen image) from a plurality of moiré fringe images received from the light receiving device 108. The details of the image computing operations performed to obtain the specimen image from the plurality of moiré fringe images are disclosed, for example, in the earlier cited document by Oouchi, entitled "Super-resolution microscope N-SIM using structured illumination," O PLUS E, Adcom Media, Vol. 34, No. 9, pp. 827-833, 2012.

The light modulating device 103 according to the first embodiment of the present invention will be described below.

Figure 2:
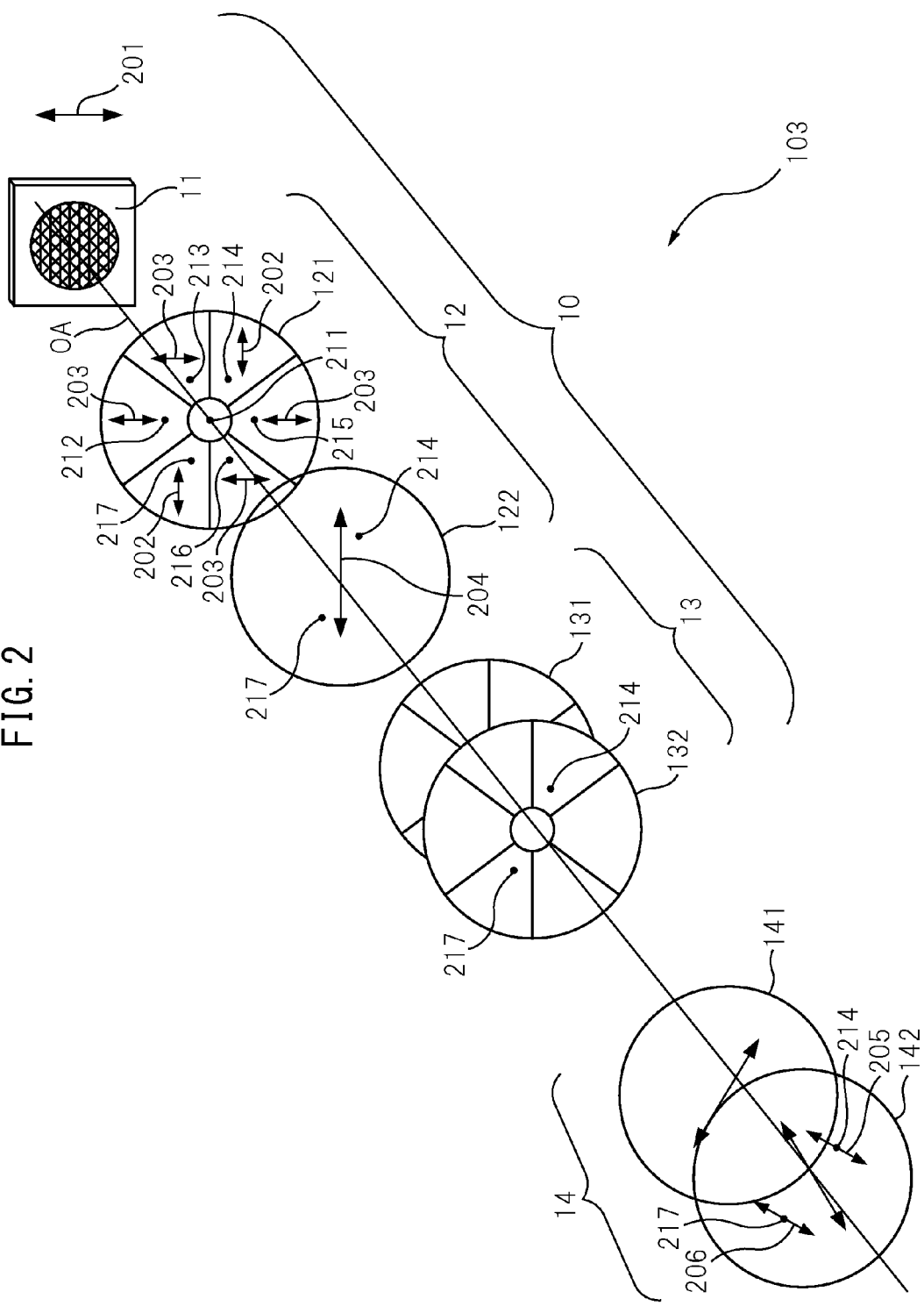
FIG. 2 is a schematic diagram of a light modulating device according to a first embodiment of the present invention.

FIG. 2 is a schematic diagram of the light modulating device 103. The light modulating device 103 includes a selective diffraction device 10 and a polarization plane rotating device 14.

The selective diffraction device 10 generates diffracted light beams of a plurality of orders by diffracting the linearly polarized illumination light from the light source 101 into a selected one of a plurality of directions. Then, the selective diffraction device 10 causes between the diffracted light beams of the respective orders a phase difference corresponding to each of the plurality of moiré fringes that is necessary to obtain the specimen image from the plurality of moiré fringe images. For this purpose, the selective diffraction device 10 includes a diffraction grating 11, a shutter 12, and a phase modulating device 13.

The diffracting grating 11 includes three sets of grating lines, each set including a plurality of grating lines formed at a predetermined pitch so as to extend in parallel with each other. Each set of grating lines is arranged at an angle of 60° relative to the others. The diffraction grating 11 may be, for example, an amplitude modulation diffraction grating each of whose grating lines is formed from a metal wire that does not transmit light, or a phase modulation diffraction grating formed so that the thickness of the grating line portion extending along the optical axis OA is different from the thickness of the portion other than the grating line portion or so that the refractive index of the portion corresponding to the grating lines is different from the refractive index of the portion other than the grating line portion. With this arrangement, the diffraction grating 11 diffracts the illumination light from the light source 101 along the three planes oriented at 60° relative to each other in directions radiating from the optical axis OA. In the present embodiment, the diffraction grating 11 generates diffracted light diffracted along the polarization plane of the illumination light indicated by arrow 201, diffracted light diffracted along the plane rotated 60° clockwise with respect to the polarization direction of the illumination light, and diffracted light diffracted along the plane rotated 60° counterclockwise with respect to the polarization direction of the illumination light. The diffracted light emerges from the diffraction grating 11 as linearly polarized light whose polarization direction coincides with the polarization direction of the illumination light. The diffracted light then enters the shutter 12.

Of the diffracted light beams entering the shutter 12, only the diffracted light beams of the orders diffracted along one particular plane passing through the optical axis OA are allowed to pass through the shutter 12. For this purpose, the shutter 12 includes a liquid crystal device 121 and an analyzer 122.

Figure 3A:
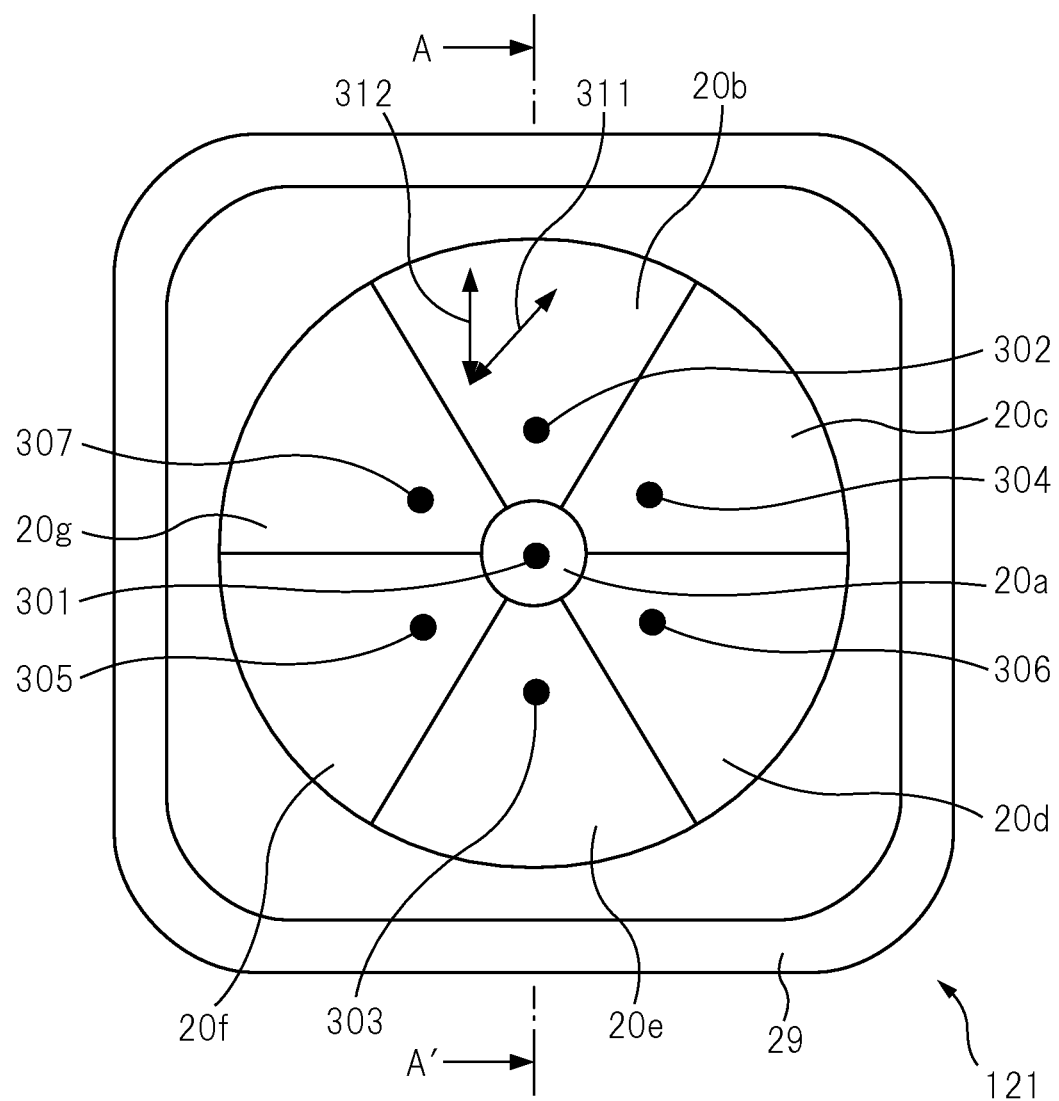
FIG. 3A is a schematic front view of a liquid crystal device as viewed from an analyzer.
Figure 3B:
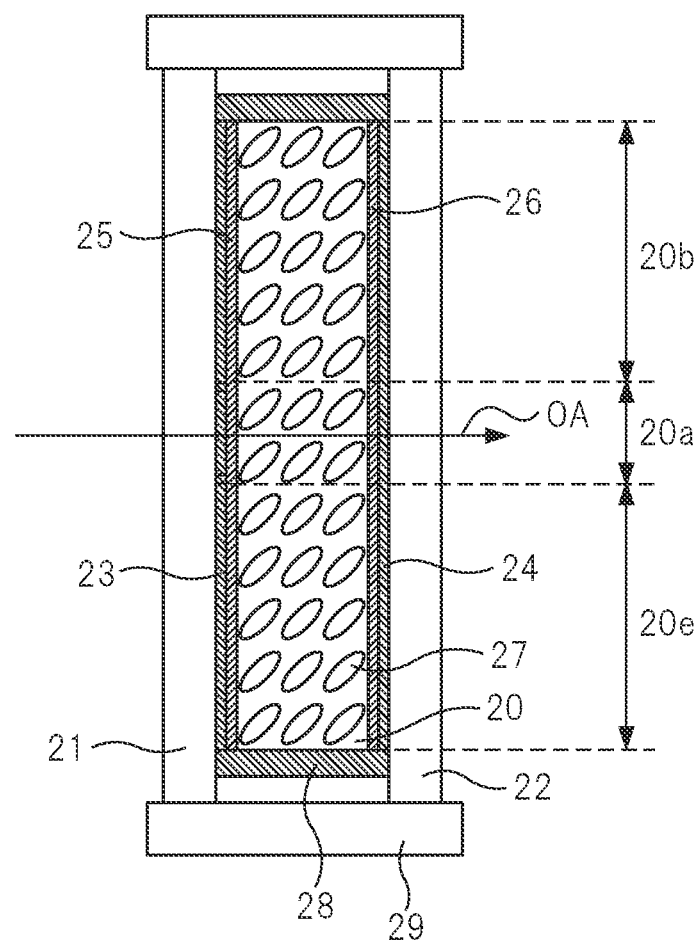
FIG. 3B is a schematic cross-sectional side view of the liquid crystal device taken along the line indicated by arrows A and A' in FIG. 3A.

FIG. 3A is a schematic front view of the liquid crystal device 121 as viewed from the analyzer 122, and FIG. 3B is a schematic cross-sectional side view of the liquid crystal device 121 taken along the line indicated by arrows A and A' in FIG. 3A.

The liquid crystal device 121 is one example of a second liquid crystal device, which acts as a half-wave plate for the diffracted light beams in the incident diffracted light that are allowed to pass through the shutter 12, and rotates by 90° the polarization plane of the diffracted light allowed to pass therethrough. The liquid crystal device 121 does not rotate the polarization plane of the diffracted light that is not allowed to pass through the shutter 12.

For this purpose, the liquid crystal device 121 includes a liquid crystal layer 20 and transparent substrates 21 and 22 arranged substantially in parallel on both sides of the liquid crystal layer 20 along the optical axis OA. The liquid crystal device 121 further includes a transparent electrode 23 sandwiched between the transparent substrate 21 and the liquid crystal layer 20 and a transparent electrode 24 sandwiched between the liquid crystal layer 20 and the transparent substrate 22. Liquid crystal molecules 27 contained in the liquid crystal layer 20 are sealed within a space enclosed by the transparent substrates 21 and 22 and sealing members 28. The thickness of the liquid crystal layer 20 is chosen to be, for example, 5 µm, which is a thickness sufficient for the liquid crystal layer 20 to act as a half-wave plate, as will be described later.

The transparent substrates 21 and 22 are each formed, for example, from glass or a resin, i.e., a material that is transparent to the illumination light that the light source 101 emits. The transparent electrodes 23 and 24 are each formed, for example, from a material prepared by adding tin oxide to indium oxide, referred to as ITO. An alignment film 25 is interposed between the transparent electrode 23 and the liquid crystal layer 20. Further, an alignment film 26 is interposed between the transparent electrode 24 and the liquid crystal layer 20. These alignment films 25 and 26 each serve to align the liquid crystal molecules 27 in a specific direction.

Further, a frame 29 is placed around the outer peripheries of the substrates, transparent electrodes, and alignment films, and the frame 29 supports the substrates in position.

In the present embodiment, the liquid crystal layer 20 includes a sub-region 20a through which the optical axis OA passes, and six sub-regions 20b to 20g formed by radially dividing the circular region surrounding the sub-region 20a into six equal zones in a plane perpendicular to the optical axis OA.

Of the diffracted light beams of various orders, only the 0th order diffracted light beam is incident on the sub-region 20a. On the other hand, either the +1st or −1st order diffracted light beam is incident on each of the sub-regions 20b to 20g. More specifically, the +1st diffracted light beam 302 diffracted along the polarization plane of the illumination light is incident on the sub-region 20b, and the −1st diffracted light beam 303 diffracted along the polarization plane of the illumination light is incident on the sub-region 20e located diametrically opposite the sub-region 20b across the sub-region 20a. On the other hand, the +1st order diffracted light 304 diffracted in a direction parallel to the plane rotated clockwise by 60° relative to the polarization plane of the illumination light is incident on the sub-region 20c, and the −1st order diffracted light 305 diffracted in a direction parallel to the plane rotated clockwise by 60° relative to the polarization plane of the illumination light is incident on the sub-region 20f located diametrically opposite the sub-region 20c across the sub-region 20a. Further, the −1st order diffracted light 306 diffracted in a direction parallel to the plane rotated counterclockwise by 60° relative to the polarization plane of the illumination light is incident on the sub-region 20d, and the +1st order diffracted light 307 diffracted in a direction parallel to the plane rotated counterclockwise by 60° relative to the polarization plane of the illumination light is incident on the sub-region 20g located diametrically opposite the sub-region 20d across the sub-region 20a. The polarization plane of each diffracted light beam incident on the liquid crystal device 121 is the same as the polarization plane of the illumination light.

The liquid crystal molecules 27 contained in the liquid crystal layer 20 are, for example, homogeneously aligned. Then, the liquid crystal molecules 27 contained in each sub-region are aligned in parallel to a direction that is oriented at 45°, as indicated by arrow 311, relative to the polarization plane 312 of the incident diffracted light. More specifically, the liquid crystal molecules 27 are aligned in a direction that bisects the angle that the polarization plane of the linearly polarized light exiting the liquid crystal device 121 makes with the polarization plane of the linearly polarized light incident on the liquid crystal device 121 when the liquid crystal device 121 acts as a half-wave plate.

Figure 4:
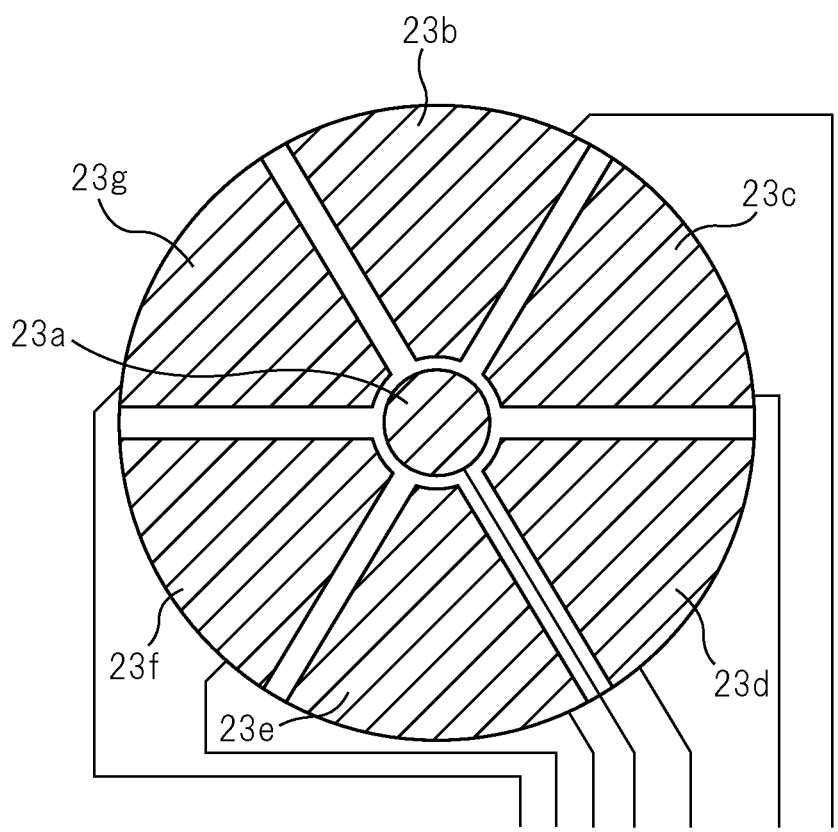
FIG. 4 is a schematic front view of a transparent electrode in the liquid crystal device in a shutter as viewed from the analyzer.

FIG. 4 is a schematic front view of the transparent electrode 23 as viewed from the analyzer 122. The transparent electrode 23 is constructed from a plurality of electrodes 23a to 23g, one for each of the sub-regions of the liquid crystal layer 20 that are electrically insulated from each other and are formed so as to cover the surfaces of the corresponding sub-regions on the analyzer side. On the other hand, the transparent electrode 24 is formed so as to cover the entire surface of the liquid crystal layer 20 that faces the diffraction grating 11. Like the transparent electrode 23, the transparent electrode 24 may also be constructed from a plurality of electrodes, one for each of the sub-regions. The controller 109 applies a voltage appropriate to the wavelength of the illumination light between the transparent electrodes 23 and 24 so that, of the sub-regions 20a to 20g of the liquid crystal layer 20, the sub-region selected to transmit the diffracted light acts as a half-wave plate for the wavelength of the illumination light.

When the voltage is applied between the transparent electrodes 23 and 24, the liquid crystal molecules 27 tilt in a direction parallel to the direction of the voltage application in response to the applied voltage. The diffracted light passing through the liquid crystal layer 20 makes an angle $\phi$ with respect to the direction of the long axes of the liquid crystal molecules 27, where $\phi$ is the angle that the direction of the long axes make with the direction of the voltage application. In this case, the refractive index $n_\phi$ of the liquid crystal molecules for the polarization component parallel to the aligning direction of the liquid crystal molecules 27 is defined by $n_o \leq n_\phi \leq n_e$, where $n_o$ is the refractive index for the polarization component perpendicular to the direction of the long axes of the liquid crystal molecules, and $n_e$ is the refractive index for the polarization component parallel to the direction of the long axes of the liquid crystal molecules.

As a result, when the liquid crystal molecules 27 contained in the liquid crystal layer 20 are homogenously aligned, and the thickness of the liquid crystal layer 20 is d, an optical path length difference $\Delta nd$ ($=n_\phi d - n_o d$) occurs between the polarization component parallel to the aligning direction of the liquid crystal molecules 27 and the polarization component perpendicular to the aligning direction of the liquid crystal molecules 27. Accordingly, by adjusting the voltage applied between the transparent electrodes 23 and 24, the optical path length difference between the polarization component parallel to the aligning direction of the liquid crystal molecules 27 and the polarization component perpendicular to the aligning direction of the liquid crystal molecules 27 can be adjusted. Therefore, by adjusting the voltage that the controller 109 applies between the transparent electrodes 23 and 24, each of the sub-regions 20a o 20g can be made to act as a half-wave plate for the wavelength of the linearly polarized light that the light source 101 outputs. When the linearly polarized light whose polarization plane is oriented at an angle $-\theta$ with respect to the aligning direction of the liquid crystal molecules 27 passes through the sub-region its polarization plane is rotated so as to be oriented at an angle $\theta$ with respect to the aligning direction of the liquid crystal molecules 27. In other words, the polarization plane is rotated through an angle $2\theta$ about the aligning direction.

In the present embodiment, the voltage is applied between the electrodes 23 and 24 so that, for each image shot, either the two of the sub-regions 20b to 20g that are diametrically opposed about the optical axis OA will simultaneously act as half-wave plates or the two sub-regions and the sub-region 20a at the center will simultaneously act as half-wave plates. In the present embodiment, since the liquid crystal molecules 27 in each sub-region are aligned so as to make an angle of 45° with the planarization plane of the diffracted light, the planarization plane of the diffracted light is rotated through 90° as the diffracted light passes through the sub-region acting as a half-wave plate, so that the planarization plane of the diffracted light emerging from the sub-region is perpendicular to the planarization plane of the illumination light, as indicated by arrow 202 in FIG. 2.

For the other sub-regions not acting as half-wave plates, voltage may be applied between the transparent electrodes sandwiching such sub-regions so that the optical path length difference between the polarization component parallel to the aligning direction of the liquid crystal molecules 27 and the polarization component perpendicular to the aligning direction becomes equal to an integral multiple of the wavelength of the illumination light. This means that the planarization plane of the diffracted light passing through any sub-region not acting as a half-wave plate remains parallel to the planarization plane of the illumination light, as indicated by arrow 203 in FIG. 2.

The diffracted light beams of the various orders passed through the liquid crystal device 121 enters the analyzer 122.

The analyzer 122 transmits only the linearly polarized light whose polarization plane is oriented in a direction perpendicular to the planarization direction of the illumination light (i.e., in the direction indicated by arrow 204 in FIG. 2). Therefore, of the diffracted light beams of the various orders entering the analyzer 122, only the diffracted light beams of the orders diffracted in one particular direction and having their polarization plane rotated through 90° by the liquid crystal device 121 are allowed to pass through the analyzer 122. For example, of the diffracted light beams 211 to 217 diffracted into different directions by the diffraction grating 11 depicted in FIG. 2, only the +1st order and −1st order diffracted light beams 214 and 217 diffracted in one particular direction pass through the shutter 12.

According to a modified example, the analyzer 122 may be oriented so that only the linearly polarized light whose polarization plane is oriented parallel to the planarization direction of the illumination light is allowed to pass through it. In this case, the controller 109 may perform control so that, for any sub-region through which the diffracted light to be passed through the shutter 12 passes, a voltage is applied so as not to cause the polarization plane of the diffracted light to rotate, on the other hand, for any sub-region through which the diffracted light not to be passed through the shutter 12 passes, a voltage is applied so as to cause the sub-region to act as a half-wave plate.

The diffracted light beams of the plurality of orders diffracted in one particular direction and passed through the shutter 12 enter the phase modulating device 13.

The phase modulating device 13 causes a predetermined phase difference to occur between the diffracted light beams of the different orders entering it. For this purpose, the phase modulating device 13 includes two liquid crystal devices 131 and 132 arranged along the optical axis OA. The two liquid crystal devices 131 and 132 are each an example of a first liquid crystal device. Since the liquid crystal devices 131 and 132 are identical in structure, the following describes the liquid crystal device 131.

Figure 5:
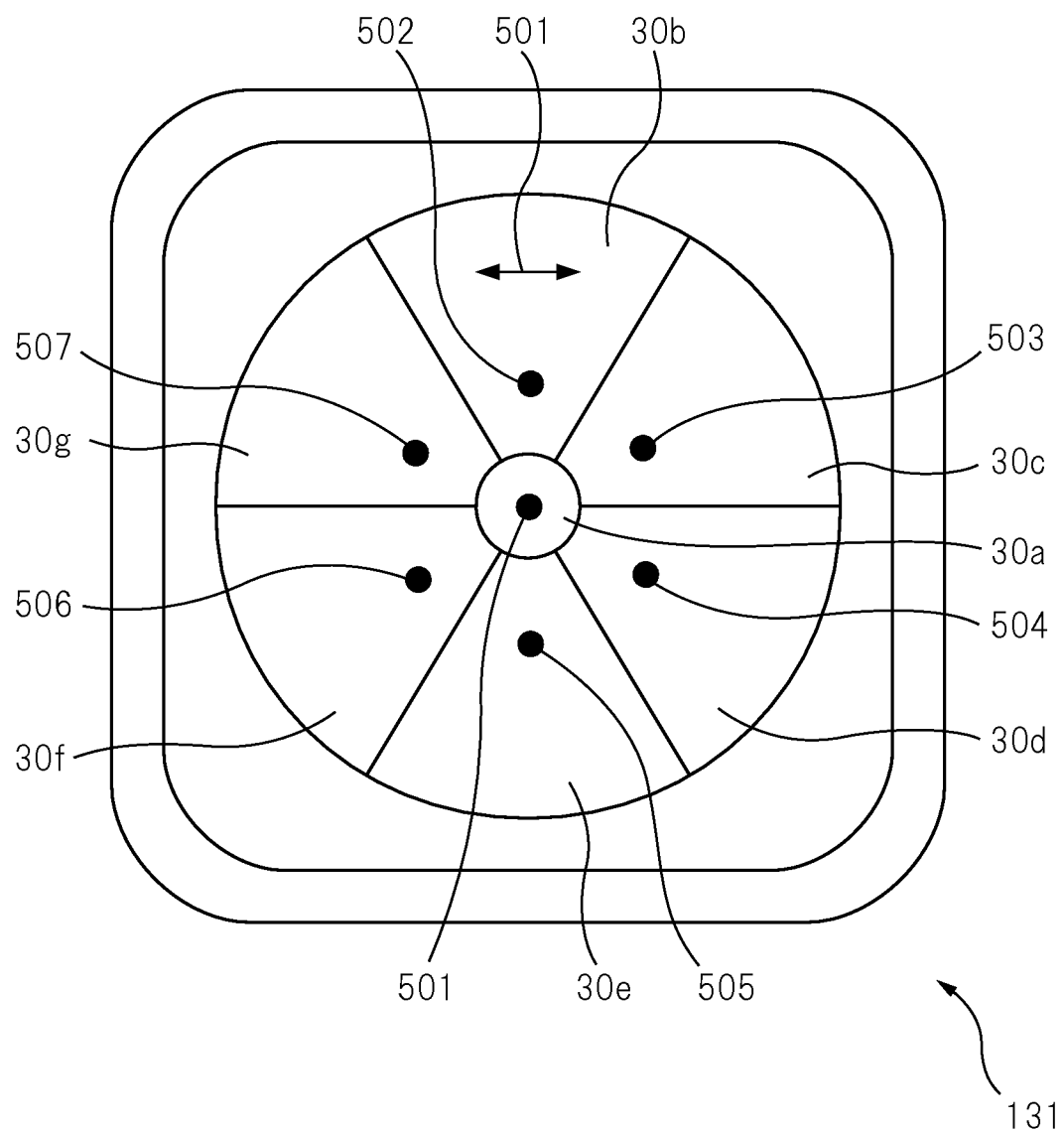
FIG. 5 is a schematic front view of a liquid crystal device in a phase modulating device as viewed from a polarization plane rotating device.

FIG. 5 is a schematic front view of the liquid crystal device 131 as viewed from the polarization plane rotating device 14. Similarly to the liquid crystal device 121 contained in the shutter 12, the liquid crystal device 131 includes two transparent substrates, a liquid crystal layer sandwiched between the two transparent substrates, a sub-region 30a through which the optical axis OA passes, and six sub-regions 30b to 30g formed by radially dividing the circular region surrounding the sub-region 30a into six equal zones in a plane perpendicular to the optical axis OA.

It is preferable that, when projected along the direction of the optical axis OA, the sub-regions 30a to 30g are located at the same positions as the corresponding sub-regions 20a to 20g of the liquid crystal device 121 in the shutter 12 depicted in FIG. 3A. In other words, the 0th order diffracted light beam 501 that passed through the sub-region 20a of the liquid crystal device 121 passes through the sub-region 30a of the liquid crystal device 131. Likewise, the +1st order and −1st order beams 502 to 507 that passed through the respective sub-regions 20b to 20g of the liquid crystal device 121 pass through the corresponding sub-regions 30b to 30g of the liquid crystal device 131. The liquid crystal device 132 also includes sub-regions similar to those of the liquid crystal device 131, and the diffracted light beams that passed through the respective sub-regions 30a to 30g of the liquid crystal device 131 pass through the corresponding sub-regions of the liquid crystal device 132. For convenience of explanation, all the +1st order and −1st order beams are shown in FIG. 5, but in actuality, only the +1st order and −1st order beams entering the two of the sub-regions 30b to 30g that are diametrically opposed about the optical axis OA, or only these +1st order and −1st order beams and the 0th order beam, will simultaneously pass through the liquid crystal device 131.

In the liquid crystal device 131, the liquid crystal molecules contained in the sub-regions 30a to 30g are aligned differently than in the liquid crystal device 121.

In the present embodiment, the liquid crystal molecules contained in the liquid crystal layer of the liquid crystal device 131 are homogeneously aligned with their long axes oriented in a direction perpendicular to the polarization direction of the illumination light emitted from the light source 101. In other words, the aligning direction of the liquid crystal molecules is substantially parallel to the polarization direction of the diffracted light emerging from the shutter 12. As a result, the optical path length that the diffracted light traverses the liquid crystal layer of the liquid crystal device 131 depends on the refractive index of the liquid crystal molecules for the polarization component parallel to the aligning direction of the liquid crystal molecules.

Let $n_1$ denote the refractive index of the liquid crystal molecules for the polarization component parallel to the aligning direction of the liquid crystal molecules in the sub-region through which the +1st order light beam as one example of a diffracted light beam of a first order passes, and $n_{-1}$ denote the refractive index of the liquid crystal molecules for the polarization component parallel to the aligning direction of the liquid crystal molecules in the sub-region through which the −1st order light beam as one example of a diffracted light beam of a second order passes; then, an optical path length difference $\Delta nd$ ($=n_1 d - n_{-1} d$) occurs between the diffracted light beams of the orders respectively passing through the two sub-regions, where d is the thickness of the liquid crystal layer of the liquid crystal device 131. The phase difference $\Delta$ occurring between the two diffracted light beams is given by $2\pi\Delta nd/\lambda$, where $\lambda$ is the wavelength of the illumination light. Similarly, when the +1st order and −1st order light beams pass through the liquid crystal device 132, the same amount of phase difference $2\pi\Delta nd/\lambda$ occurs between these two diffracted light beams. Accordingly, when the +1st order and −1st order light beams pass through the phase modulating device 13, a phase difference of $4\pi\Delta nd/\lambda$ occurs between these two diffracted light beams.

For example, when the +1st order diffracted light beam passes through the sub-region 30b, and the −1st order diffracted light beam passes through the sub-region 30e, the controller 109 sets the voltage to be applied between the two opposing transparent electrodes across the sub-region 30b differently from the voltage to be applied between the two opposing transparent electrodes across the sub-region 30e, and thereby provides a phase difference of, for example, $1/3\pi$, $2/3\pi$, $4/3\pi$, or $2\pi$ between the +1st order diffracted light beam and the −1st order diffracted light beam.

Figure 6:
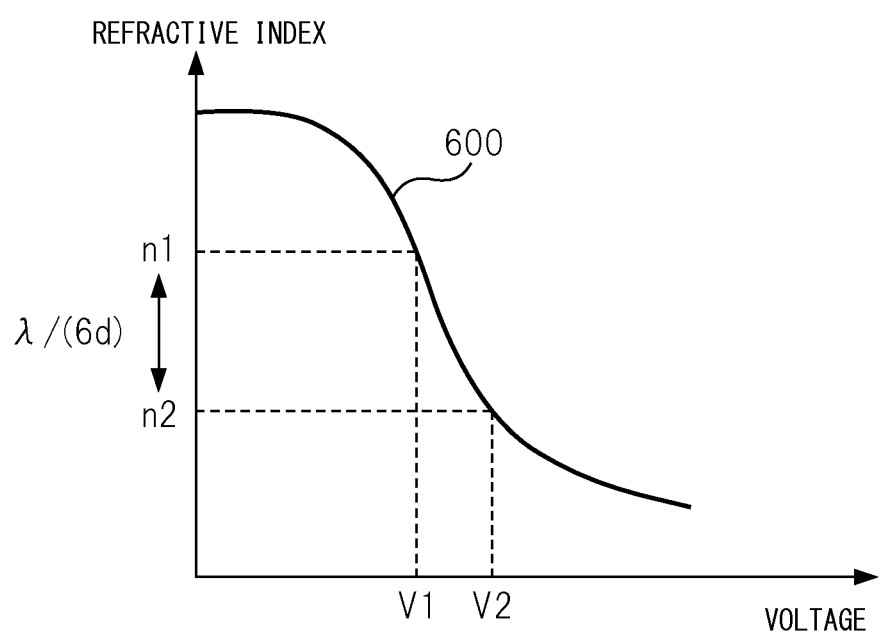
FIG. 6 is a graph illustrating the relationship between the voltage applied to the liquid crystal layer of the liquid crystal device in the phase modulating device and the refractive index of liquid crystal molecules for a polarization component parallel to the aligning direction of the liquid crystal molecules.

FIG. 6 is a graph illustrating the relationship between the voltage applied to the liquid crystal layer of the liquid crystal device 131 and the refractive index of the liquid crystal molecules for the polarization component parallel to the aligning direction of the liquid crystal molecules. The voltage is plotted along the abscissa, and the refractive index along the ordinate. The graph 600 is one example of a voltage versus refractive index curve for light of wavelength $\lambda$, plotting the refractive index of the liquid crystal molecules for the polarization component parallel to the aligning direction of the liquid crystal molecules as a function of the voltage applied to the liquid crystal layer.

For example, suppose that the applied voltage to the sub-region 30b is V1 and that the corresponding refractive index of the sub-region 30b for the polarization component parallel to the aligning direction is n1. Also suppose that the applied voltage to the sub-region 30e is V2 and that the corresponding refractive index of the sub-region 30e for the polarization component parallel to the aligning direction is n2.

If, for example, a phase difference of $2/3\pi$ is to be provided between the +1st order and −1st order diffracted light beams passing through the phase modulating device 13, then the controller 109 refers to the graph 600 and adjusts the voltages V1 and V2 so that the difference $\Delta n$ between the refractive indexes n1 and n2 becomes equal to $\lambda/(6d)$. Likewise, if a phase difference of $4/3\pi$ or $2\pi$ is to be provided between the +1st order and −1st order diffracted light beams passing through the phase modulating device 13, then the controller 109 refers to the graph 600 and adjusts the voltages V1 and V2 so that the difference $\Delta n$ between the refractive indexes n1 and n2 becomes equal to $\lambda/(3d)$ or $\lambda/(2d)$.

When generating a moiré fringe image by using, in addition to the +1st order and −1st order diffracted light beams, the 0th order diffracted light beam which is another example of the diffracted light beam of the second order, the controller 109 refers to the graph 600 and determines the voltage to be applied to each sub-region so that a predetermined phase difference (for example, $2/5\pi$, $4/5\pi$, $8/5\pi$, etc.) is provided between the +1st order diffracted light beam passing through the sub-region 30b and the 0th order diffracted light beam passing through the sub-region 30a and between the −1st order diffracted light beam passing through the sub-region 30e and the 0th order diffracted light beam passing through the sub-region 30a.

If the light source 101 includes a plurality of light-emitting devices, the controller 109 may store a voltage versus refractive index curve for each light-emitting device.

In this case, by referring to the voltage versus refractive index curve corresponding to the wavelength of the illumination light emitted from the light-emitting device used, the controller 109 can appropriately determine the voltage to be applied to each sub-region of the phase modulating device. Similarly, the controller 109 may store a voltage versus refractive index curve for each of a plurality of temperatures of the light modulating device 103. In this case, by referring to the voltage versus refractive index curve corresponding to the temperature closest to the temperature measured by a thermometer (not depicted) placed near the light modulating device 103, the controller 109 can appropriately determine the voltage to be applied to each sub-region of the phase modulating device.

Further, since the phase modulating device 13 is constructed using the two liquid crystal devices 131 and 132, the liquid crystal layer in each liquid crystal device can be chosen to have a thickness such that the maximum value of the optical path length difference that occurs between the two diffracted light beams passing through the liquid crystal layer is less than the wavelength of the illumination light, i.e., a thickness that can cause an optical path length difference equal to one-half the wavelength of the illumination light at the maximum. Generally, the response speed of a liquid crystal device is proportional to the square of the thickness of the liquid crystal layer; therefore, by reducing the thickness of the liquid crystal layer in each liquid crystal device, the phase modulating device 13 can increase the response speed of the liquid crystal device when changing the phase difference to be provided between the diffracted light beams of different orders. In particular, in the present embodiment, at least three moiré fringe images are captured, one for each direction into which the illumination light is diffracted, by changing the phase difference to be provided between the diffracted light beams of different orders. As a result, by increasing the response speed of the liquid crystal devices 131 and 132, the light modulating device 103 can further reduce the time needed to generate the specimen image.

According to a modified example, the phase modulating device 13 may include only one liquid crystal device 131. In this case, the thickness of the liquid crystal layer in the liquid crystal device 131 need only be chosen so that an optical path length difference equal to the wavelength of the diffracted light can be caused between the diffracted light beams of different orders passing through the liquid crystal layer. When the phase modulating device 13 is constructed using only one liquid crystal device, the overall cost of the light modulating device 103 can be reduced, though the response speed of the liquid crystal device when changing the phase difference to be provided between the diffracted light beams becomes slower because of the increased thickness of the liquid crystal layer than in the case of the phase modulating device constructed using a plurality of liquid crystal devices.

The diffracted light that passed through the phase modulating device 13 enters the polarization plane rotating device 14.

The polarization plane rotating device 14 rotates the polarization plane of the diffracted light so that the diffracted light passed through the polarization plane rotating device 14 is focused as S-polarized light on the specimen. More specifically, since the diffracted light output from the light modulating device 103 is directed from outside the optical axis toward the point of intersection between the optical axis and the object surface so as to be incident obliquely on the object surface, the polarization plane of the diffracted light need only be rotated so as to be perpendicular to the direction radiating from the optical axis OA. For example, in FIG. 2, the polarization planes of the diffracted light beams 214 and 217 that passed through the phase modulating device 13 are oriented in directions indicated by arrows 205 and 206 when the diffracted light beams emerge from the polarization plane rotating device 14. For this purpose, the polarization plane rotating device 14 includes two liquid crystal devices 141 and 142. The liquid crystal devices 141 and 142 are each an example of a third liquid crystal device.

Figure 7A:
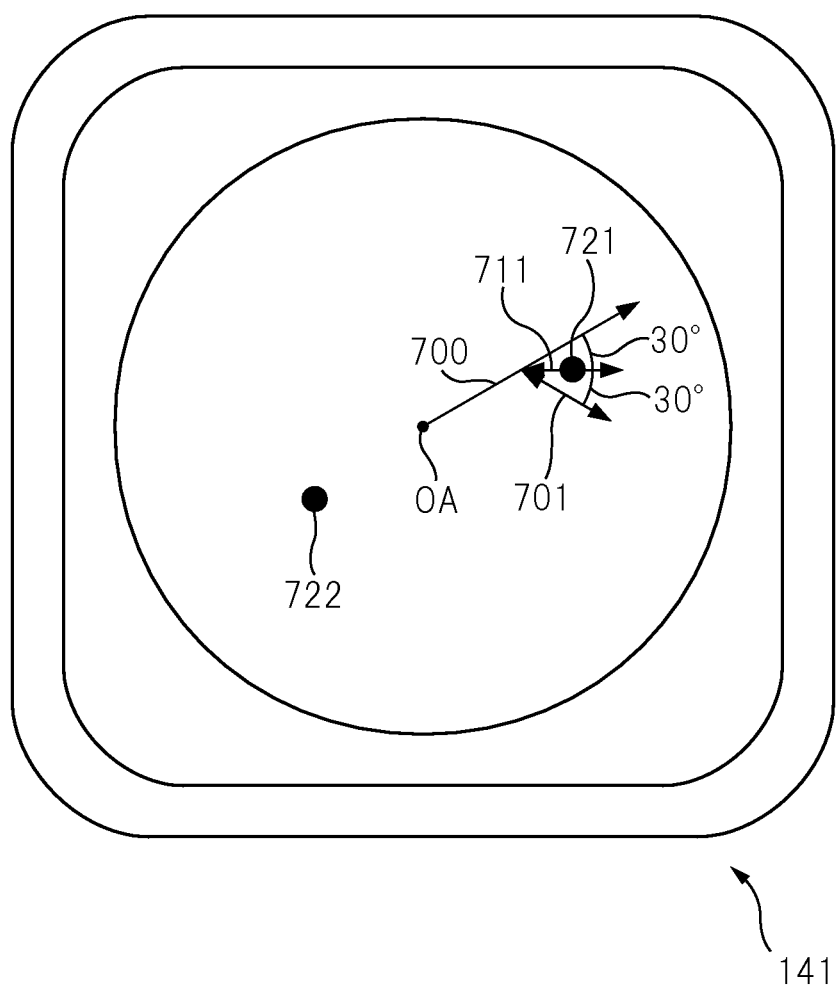
FIG. 7A is a schematic front view of a liquid crystal device in the polarization plane rotating device as viewed from the diffracted light exit side.
Figure 7B:
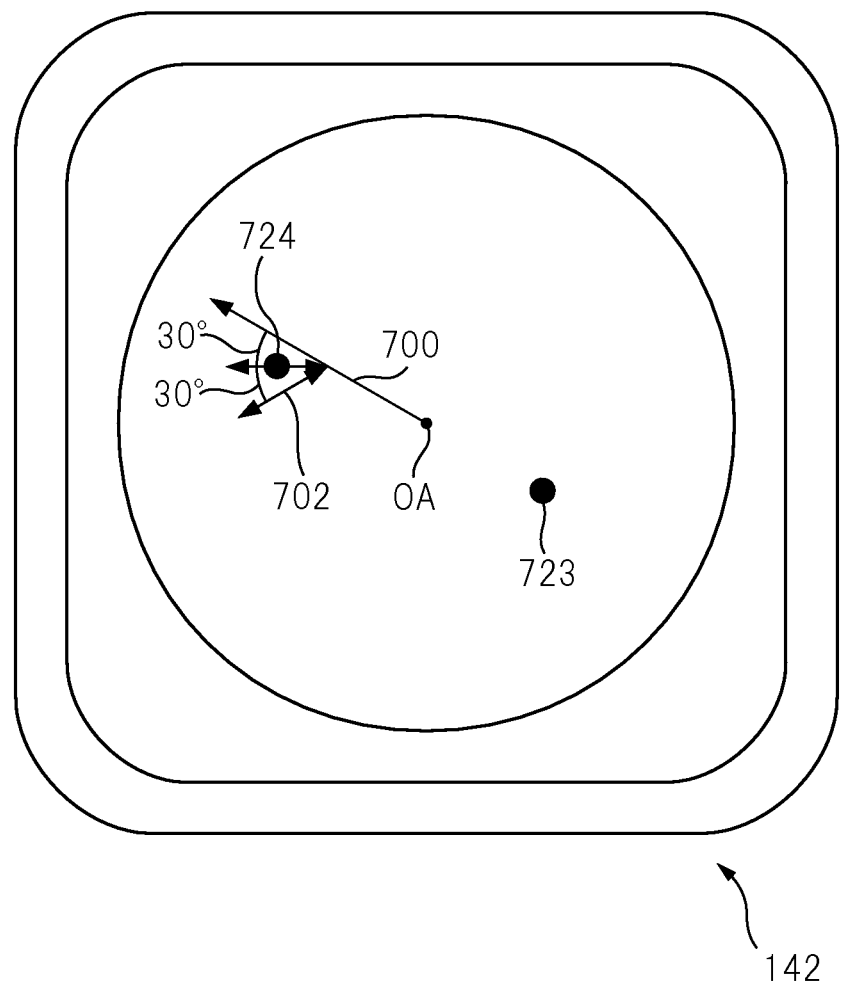
FIG. 7B is a schematic front view of a liquid crystal device in the polarization plane rotating device as viewed from the diffracted light exit side.

FIGS. 7A and 7B are schematic front views of the liquid crystal devices 141 and 142, respectively, as viewed from the diffracted light exit side. Similarly to the liquid crystal device 121 contained in the shutter 12, the liquid crystal devices 141 and 142 each include two transparent substrates and a liquid crystal layer sandwiched between the two transparent substrates. The liquid crystal molecules contained in the liquid crystal layers of the respective liquid crystal devices 141 and 142 are also homogeneously aligned. However, the liquid crystal devices 141 and 142 differ from the liquid crystal device 121 in that the two transparent substrates sandwiching the liquid crystal layer in each of the liquid crystal devices 141 and 142 are provided so as to cover the entire liquid crystal layer and in that the liquid crystal molecules are aligned differently.

In FIG. 7A, arrow 701 indicates the aligning direction of the liquid crystal molecules contained in the liquid crystal layer of the liquid crystal device 141. The polarization planes (indicated by arrow 711) of the diffracted light beams 721 and 722 passed through the sub-regions 20c and 20f of the liquid crystal device 121 in the shutter 12 oriented 30° clockwise with respect to a line 700 radiating from the optical axis OA are rotated as the light beams pass through the liquid crystal device 141, and the diffracted light beams emerge from it with their polarization planes oriented perpendicular to the line radiating from the optical axis OA. For this purpose, the aligning direction of the liquid crystal molecules in the liquid crystal device 141 is tilted 30° clockwise with respect to the polarization planes of the diffracted light beams passed through the sub-regions 20c and 20f. In other words, the aligning direction of the liquid crystal molecules in the liquid crystal device 141 is the direction that bisects the angle between the polarization direction of the diffracted light beams 721 and 722 and the direction perpendicular to the direction radiating from the optical axis OA.

When the shutter 12 selectively allows the diffracted light beams passed through the sub-regions 20c and 20f of the liquid crystal device 121 to pass therethrough, the controller 109 applies such a voltage across the pair of transparent electrodes sandwiching the liquid crystal layer in the liquid crystal device 141 as to cause the liquid crystal device 141 to act as a half-wave plate. As a result, the polarization planes of the diffracted light beams 721 and 722 passed through the sub-regions 20c and 20f are rotated through twice the angle that the polarization planes make with the aligning direction 701 as the light beams pass through the liquid crystal device 141, i.e., the polarization planes are rotated 60° clockwise, so that the diffracted light beams emerge with their polarization planes oriented perpendicular to the line radiating from the optical axis OA.

In FIG. 7B, arrow 702 indicates the aligning direction of the liquid crystal molecules contained in the liquid crystal layer of the liquid crystal device 142. The polarization planes (indicated by arrow 712) of the diffracted light beams 723 and 724 passed through the sub-regions 20d and 20g of the liquid crystal device 121 in the shutter 12 oriented 30° counterclockwise with respect to the line 700 radiating from the optical axis OA are rotated as the light beams pass through the liquid crystal device 142, and the diffracted light beams emerge from it with their polarization planes oriented perpendicular to the line 700 radiating from the optical axis OA. For this purpose, the aligning direction of the liquid crystal molecules in the liquid crystal device 142 is tilted 30° counterclockwise with respect to the polarization planes of the diffracted light beams passed through the sub-regions 20d and 20g. In other words, the aligning direction of the liquid crystal molecules in the liquid crystal device 142 is also the direction that bisects the angle between the polarization direction of the diffracted light beams 723 and 724 and the direction perpendicular to the direction radiating from the optical axis OA.

When the shutter 12 selectively allows the diffracted light beams passed through the sub-regions 20d and 20g of the liquid crystal device 121 to pass therethrough, the controller 109 applies such a voltage across the pair of transparent electrodes sandwiching the liquid crystal layer in the liquid crystal device 142 as to cause the liquid crystal device 142 to act as a half-wave plate. As a result, the polarization planes of the diffracted light beams 723 and 724 passed through the sub-regions 20d and 20g are rotated through twice the angle that the polarization planes make with the aligning direction 702 as the light beams pass through the liquid crystal device 142, i.e., the polarization planes are rotated 60° counterclockwise, so that the diffracted light beams emerge with their polarization planes oriented perpendicular to the line radiating from the optical axis OA.

On the other hand, when the shutter 12 selectively allows the diffracted light beams passed through the sub-regions 20b and 20e of the liquid crystal device 121, each having a polarization plane oriented perpendicular to the line radiating from the optical axis OA, to pass therethrough, the polarization plane rotating device 14 need not rotate the polarization planes of these diffracted light beams, since the polarization planes of these diffracted light beams are already oriented perpendicular to the line radiating from the optical axis OA before the light beams enter the polarization plane rotating device 14. Therefore, in this case, the controller 109 applies such a voltage to the liquid crystal devices 141 and 142 that the difference between the optical path length for the polarization component parallel to the aligning direction of the liquid crystal molecules and the optical path length for the polarization component perpendicular to the aligning direction becomes equal to an integral multiple of the wavelength of the diffracted light.

Similarly, when the shutter 12 selectively allows the diffracted light beams passed through the sub-regions 20c and 20d of the liquid crystal device 121 to pass therethrough, the controller 109 applies such a voltage to the liquid crystal device 142 that the difference between the optical path length for the polarization component parallel to the aligning direction of the liquid crystal molecules and the optical path length for the polarization component perpendicular to the aligning direction becomes equal to an integral multiple of the wavelength of the diffracted light. Likewise, when the shutter 12 selectively allows the diffracted light beams passed through the sub-regions 20d and 20g of the liquid crystal device 121 to pass therethrough, the controller 109 applies such a voltage to the liquid crystal device 141 that the difference between the optical path length for the polarization component parallel to the aligning direction of the liquid crystal molecules and the optical path length for the polarization component perpendicular to the aligning direction becomes equal to an integral multiple of the wavelength of the diffracted light.

As a result, the diffracted light passed through the polarization plane rotating device 14 is incident as S-polarized light on the specimen.

As has been described above, since the light modulating device according to the one embodiment of the present invention is constructed to control the phase and the polarization plane of each diffracted light beam by using liquid crystal devices, the need for mechanically operated components can be eliminated. Furthermore, by eliminating the need for mechanically operated components, the light modulating device can reduce the time needed to change the phase or the diffraction direction of the diffracted light, and as a result, the microscope apparatus can reduce the time needed to shoot each individual moiré fringe image and hence can reduce the time needed to generate the specimen image.

The present invention is not limited to the above specific embodiment. For example, the shutter 12 may include, instead of the liquid crystal device 121, a transmittance modulating device having a multilayered film whose transmittance varies with applied voltage. In this case, it is preferable that transparent electrodes similar in structure to the transparent electrodes 23 and 24 are provided so as to oppose each other across the multilayered film so that voltage can be applied independently to each of the sub-regions through which the 0th order, +1st order, and −1st order diffracted light beams respectively pass. In this modified example, the analyzer 122 may be omitted, since the diffracted light to be passed through can be selected by the transmittance modulating device itself.

If the 0th order diffracted light beam is not used for the generation of a moiré fringe image, the sub-region through which the optical axis passes may be omitted from the liquid crystal device 121 in the shutter 12 and also from the liquid crystal devices 131 and 132 in the phase modulating device 13. In this case, the liquid crystal layer in each liquid crystal device is divided into a plurality of fan-shaped sub-regions centered about the optical axis.

According to another modified example, the polarization plane rotating device 14 may be constructed from an azimuth polarization converting device that converts linearly polarized light into polarized light having a polarization plane oriented in a direction parallel to a circumference centered about the optical axis.

Figure 8:
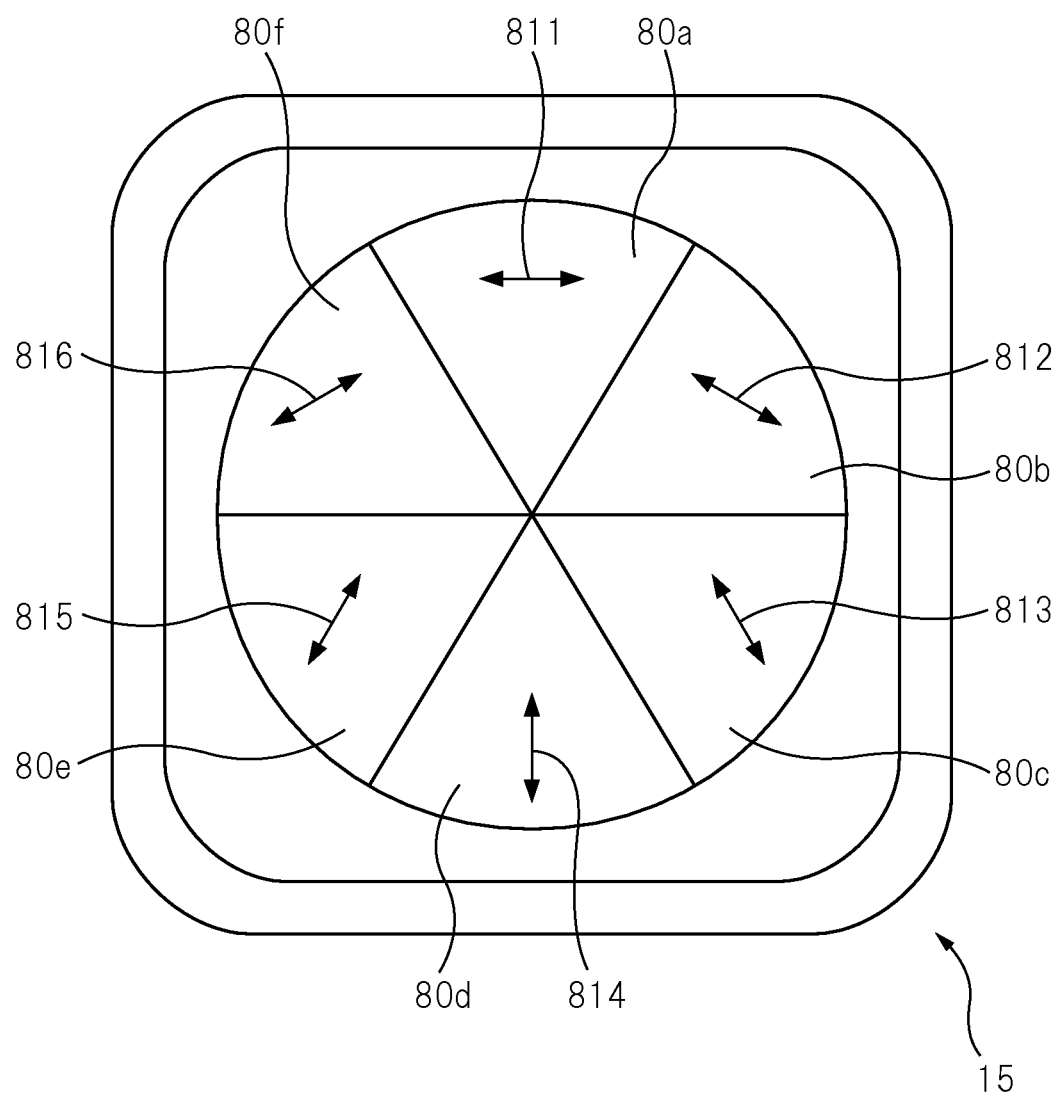
FIG. 8 is a schematic front view of an azimuth polarization converting device according to a modified example, as viewed from the diffracted light exit side.

FIG. 8 is a schematic front view of the azimuth polarization converting device according to the modified example, as viewed from the diffracted light exit side. Similarly to the liquid crystal device 121 contained in the shutter 12, the azimuth polarization converting device 15 includes two transparent substrates, a liquid crystal layer sandwiched between the two transparent substrates, and six sub-regions 80a to 80f formed by radially dividing the circular region centered about the optical axis OA into six equal zones in a plane perpendicular to the optical axis OA.

It is preferable that, when projected along the direction of the optical axis OA, the sub-regions 80a to 80f are located at the same positions as the corresponding sub-regions 20b to 20g of the liquid crystal device 121 in the shutter 12 depicted in FIG. 3A. In other words, the +1st order diffracted light beam that passed through the sub-region 20b of the liquid crystal device 121 next passes through the phase modulating device 13 and then passes through the sub-region 80a of the azimuth polarization converting device 15. Likewise, the +1st order and −1st order beams that passed through the respective sub-regions 20c to 20g of the liquid crystal device 121 next pass through the phase modulating device 13 and then pass through the corresponding sub-regions 80b to 80f of the azimuth polarization converting device 15.

In the azimuth polarization converting device 15, the liquid crystal molecules contained in the sub-regions 80a to 80g are aligned differently than in the liquid crystal device 121. Arrows 811 to 817 indicate the aligning directions of the liquid crystal molecules in the respective sub-regions 80a to 80g.

In the present embodiment, the liquid crystal molecules in the sub-region 80a are aligned in a direction perpendicular to the direction radiating from the optical axis OA in order not to rotate the polarization plane of the diffracted light. By contrast, in the sub-region 80d diametrically opposed to the sub-region 80a about the optical axis OA, the liquid crystal molecules are aligned in a direction parallel to the direction radiating from the optical axis OA in order to rotate the polarization plane of the diffracted light by 180°. On the other hand, in the sub-region 80b, as in the liquid crystal device 141, the aligning direction of the liquid crystal molecules is tilted 30° clockwise with respect to the polarization plane of the diffracted light beam passed through the sub-regions 20c of the liquid crystal device 121 in the shutter 12. Further, the aligning direction in the sub-region 80e is tilted 120° clockwise with respect to the polarization plane of the diffracted light beam passed through the sub-regions 20f of the liquid crystal device 121 in the shutter 12. On the other hand, in the sub-region 80f, as in the liquid crystal device 142, the aligning direction of the liquid crystal molecules is tilted 30° counterclockwise with respect to the polarization plane of the diffracted light beam passed through the sub-regions 20g of the liquid crystal device 121 in the shutter 12. Further, the aligning direction in the sub-region 80c is tilted 120° counterclockwise with respect to the polarization plane of the diffracted light beam passed through the sub-regions 20d of the liquid crystal device 121 in the shutter 12.

In the modified example, the controller 109 applies such a voltage to each sub-region of the azimuth polarization converting device 15 as to cause that sub-region to act as a half-wave plate for the diffracted light passing therethrough, and thus the azimuth polarization converting device 15 can rotate the polarization plane of each diffracted light beam passing therethrough so that the diffracted light beam emerges therefrom with its polarization plane oriented perpendicular to the direction radiating from the optical axis OA. As a result, in this modified example, the control of the polarization plane rotating device 14 by the controller 109 can be simplified, because the same voltage need only be applied to the liquid crystal layer in the azimuth polarization converting device 15, regardless of the diffracted light passed through the shutter 12.

Further, if the light source 101 includes only one light-emitting device, and therefore the wavelength of the illumination light is fixed, then the azimuth polarization converting device may be constructed from a device other than a liquid crystal device. For example, to construct the azimuth polarization converting device, a crystal, such as a photonic crystal or a uniaxial crystal like quartz, that exhibits birefringence, and that is oriented so that the direction of its optic axis differs for each of the fan-shaped regions defined around the optical axis OA, may be formed in the shape of a fan, and a plurality of such fan-shaped crystals may be joined together so as to be centered around the optical axis OA. In this case, the thickness of each crystal is determined so that the crystal acts as a half-wave plate for the wavelength of the illumination light that the light source 101 emits. Further, the orientation of each crystal is determined so that the optic axis of the crystal is oriented in a direction, for example, parallel to the aligning direction of the liquid crystal molecules shown in FIG. 8. When the crystals are arranged in this manner, the polarization plane of each diffracted light beam entering the azimuth polarization converting device is rotated about the optic axis of the crystal through an angle $2\theta$, i.e., twice the angle $\theta$ that the polarization plane of the incident linearly polarized light makes with the optic axis. As a result, the light emerges from the azimuth polarization converting device as azimuthally polarized light.

According to a further modified example, the shutter may include two or more liquid crystal devices arranged along the direction of the optical axis, as in the phase modulating device. This serves to increase the response speed of the shutter, because the thickness of the liquid crystal layer in each of the liquid crystal devices constituting the shutter can be reduced. Accordingly, the light modulating device of this modified example can enhance the speed of operation when switching the diffracted light to be passed through the shutter. In particular, when the polarization plane rotating device is constructed as an azimuth polarization converting device, the light modulating device of this modified example can further enhance the speed of operation while suppressing an increase in the cost of the light modulating device and a decrease in transmittance, because the number of liquid crystal devices constituting the light modulating device increases only by one compared with the above-described embodiment.

Further, in order to increase the response speed of the polarization plane rotating device, the polarization plane rotating device may also be constructed using two or more liquid crystal devices arranged along the direction of the optical axis, one for each diffraction direction for the rotation of the polarization plane. Furthermore, one or more devices arbitrarily selected from among the shutter, the phase modulating device, and the polarization plane rotating device may each be constructed using two or more liquid crystal devices, as in the above-described embodiment or modified example. In this way, in the microscope apparatus incorporating the light modulating device, it is preferable to increase the number of liquid crystal devices, as described above, for any one or more devices that perform a large number of switching operations to switch the diffraction direction, the phase difference, or the rotation of the polarization plane in accordance with the image shooting sequence.

According to a still further modified example, the diffraction grating may be constructed to generate diffracted light diffracted in one or two directions or in four or more directions. For example, the diffraction grating may be constructed by arranging grating lines at a prescribed pitch along a direction parallel to the polarization plane and along a direction perpendicular to the polarization plane so as to generate diffracted light diffracted in a direction parallel to the polarization direction of the illumination light and diffracted light diffracted in a direction perpendicular to the polarization direction. In this case also, the sub-regions of the liquid crystal device in the shutter 12 and the sub-regions of the liquid crystal device in the phase modulating device 13 are defined so that one of the 0th order, +1st order, and −1st order diffracted light beams enters a corresponding one of the sub-regions.

Next, a light modulating device 103' according to a second embodiment of the present invention will be described.

Figure 9:
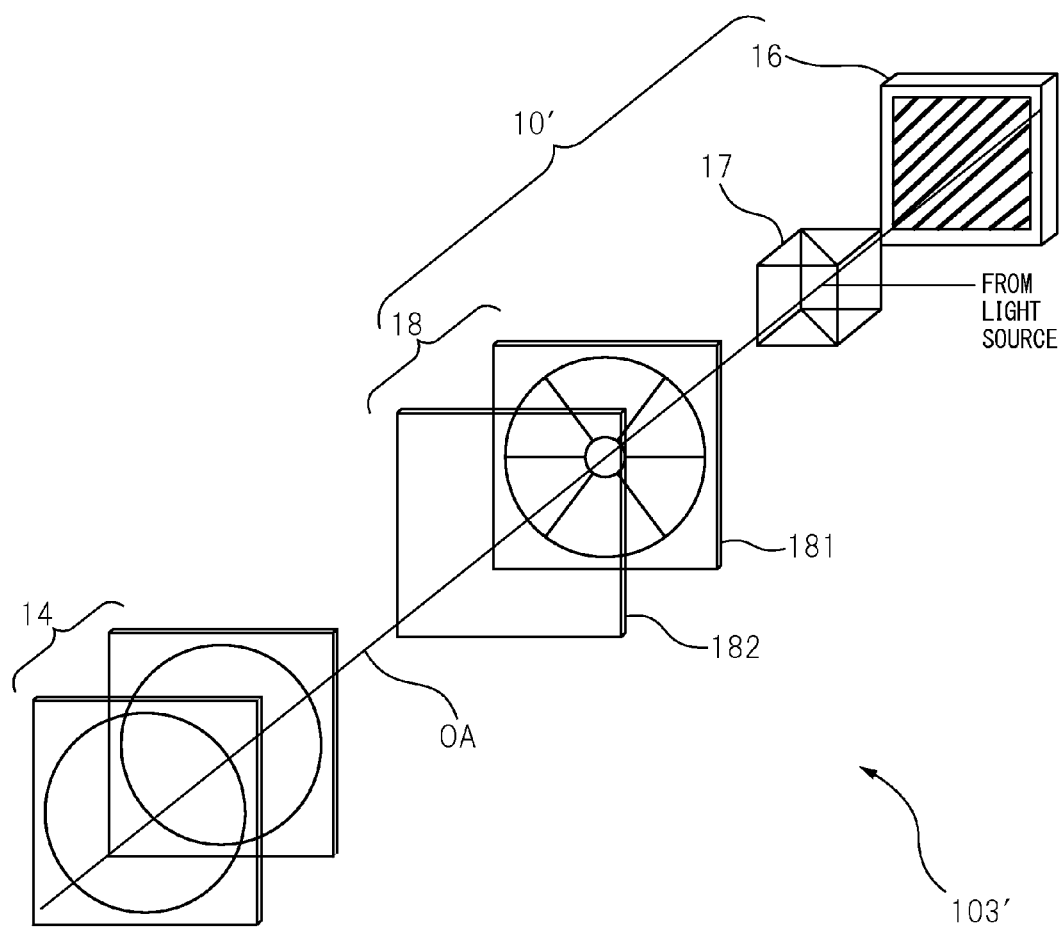
FIG. 9 is a schematic diagram illustrating a light modulating device according to a second embodiment.

FIG. 9 is a schematic diagram illustrating the light modulating device 103' according to the second embodiment. The light modulating device 103' includes a selective diffraction device 10' and a polarization plane rotating device 14. The light modulating device 103' of the second embodiment differs from the light modulating device 103 of the first embodiment illustrated in FIG. 2 in the configuration of the selective diffraction device 10'. Therefore, the following describes the selective diffraction device 10'.

The selective diffraction device 10' includes a spatial light modulating device 16, a polarization beam splitter 17, and a shutter 18 arranged in this order along the optical axis OA as viewed from the side opposite from the side on which the polarization plane rotating device 14 is located.

The illumination light emitted from the light source 101 enters the polarization beam splitter 17 from a direction perpendicular to the optical axis OA. The polarization beam splitter 17 reflects the illumination light toward the spatial light modulating device 16. The diffracted light generated by the spatial light modulating device 16 diffracting the illumination light passes through the polarization beam splitter 17 and enters the shutter 18.

The spatial light modulating device 16 displays a diffraction grating that generates diffraction light beams of a plurality of orders by diffracting the illumination light into a selected one of a plurality of directions and that provides various phase differences to be used in structured illumination between the diffraction light beams of the plurality of orders. For this purpose, the spatial light modulating device 16 is constructed from a liquid crystal device having independent driving electrodes, one for each of a plurality of pixels arranged in a two-dimensional array, on at least one side (i.e., the back side) of a liquid crystal layer. The constructed liquid crystal device can adjust the transmittance or refractive index independently for each pixel by adjusting on a pixel-by-pixel basis a voltage to be applied between a corresponding one of the driving electrodes and a transparent electrode that is provided on the other side (i.e., the transmitting side) of the liquid crystal layer so as to cover the entire area of the light control region. In the present embodiment, a reflective liquid crystal device such as a liquid crystal on silicon (LCOS) device is used as the spatial light modulating device 16. By adjusting the voltage to be applied to each pixel in the spatial light modulating device 16, the controller 109 can cause it to display the diffraction grating that diffracts the illumination light in a desired direction. For example, when diffracting the illumination light along the polarization plane of the illumination light, the controller 109 causes the spatial light modulating device 16 to display the diffraction grating such that the transmittance or refractive index varies periodically along the polarization plane. Alternatively, only for the pixels chosen to reflect the illumination light toward the shutter 18, the spatial light modulating device 16 may be operated so as to rotate the polarization plane of the illumination light by π/2 on reflection so that only the light reflected by these pixels passes through the polarization beam splitter 17.

Further, to adjust the polarization direction of the illumination light, a wave plate may be placed between the polarization beam splitter 17 and the spatial light modulating device 16.

Further, in order to adjust the phase difference between the diffracted light beams of the respective orders, the controller 109 performs control so that the positions of the grating lines of the diffracting grating displayed by the spatial light modulating device 16 are shifted in a direction perpendicular to the grating lines, i.e., in a direction in which the illumination light is diffracted, by an amount corresponding to the phase difference to be provided. For example, when the diffraction grating is shifted by a 1/2 pitch along the direction of the repetition period, the phase difference between the +1st order and −1st order diffracted light beams changes by 2π. When the phase difference to be provided between the +1st order and −1st order diffracted light beams is Δ, the controller 109 performs control so that, from the position of the diffraction grating at which the phase difference between the +1st order and −1st order diffracted light beams is 0, the diffraction grating is shifted along the diffraction direction of the illumination light by an amount equal to the product of (Δ/4π) and one pitch length of the diffraction grating.

The shutter 18 is similar in structure and function to the shutter 12 of the first embodiment. In other words, the shutter 18 includes a liquid crystal device 18 and an analyzer 18 arranged in this order along the optical axis OA as viewed from the spatial light modulating device 16. The liquid crystal layer contained in the liquid crystal device 18 is divided into a plurality of sub-regions through which the diffracted light beams of various orders diffracted in various diffraction directions respectively pass, and independent transparent electrodes, one for each sub-region, are provided at least on one side of the liquid crystal layer. Then, the controller 109 adjusts the voltage to be applied to the transparent electrode corresponding to each sub-region so that only the sub-regions through which the diffracted light generated by the spatial light modulating device 16 passes act to rotate or maintain the polarization plane of the diffracted light passing therethrough, thereby making the polarization plane coincide with the polarization direction of the light that can pass through the analyzer 182. As a result, the diffracted light generated by the spatial light modulating device 16 is allowed to pass through the shutter 18, on the other hand, stray light generated by the spatial light modulating device 16 and entering other sub-regions than the sub-regions through which the diffracted light passes is attenuated. Since the shutter 18 serves to attenuate the stray light generated by the spatial light modulating device 16 and reaching the specimen by passing through the polarization plane rotating device 14, the contrast of the resulting moiré fringe image can be enhanced.

If the amount of stray light that can reach the specimen by passing through the spatial light modulating device 16 and polarization plane rotating device 14 is negligibly small, the shutter 18 may be omitted.

Further, for each sub-region of the liquid crystal layer through which the diffracted light beam of the corresponding order passes, the controller 109 may adjust the applied voltage so that the amount of diffracted light emerging from the shutter 18 becomes substantially equal regardless of the order of the diffracted light. For example, if the amount of light in the +1st order diffracted light beam is larger than the amount of light in the −1st order diffracted light beam when incident on the shutter 18, the controller 19 adjusts the voltage to be applied to the sub-region through which the +1st order diffracted light beam passes and the voltage to be applied to the sub-region through which the −1st order diffracted light beam passes so that the polarization plane of the −1st order diffracted light beam passed through the liquid crystal device 181 better matches the polarization direction of the analyzer 182 than the polarization plane of the +1st order diffracted light beam passed through the liquid crystal device 181 does. This serves to enhance the contrast of the resulting moiré fringe image.

According to the second embodiment, since the selective diffraction device can selectively generate only the diffracted light to be projected on the specimen, the light modulating device of the second embodiment can enhance the utilization efficiency of the illumination light. Since this serves to increase the amount of light per unit time to be projected on the specimen, the light modulating device of the second embodiment can further reduce the time that the microscope apparatus takes to shoot each individual moiré fringe image, and as a result, can further reduce the time needed to generate the specimen image. Accordingly, the light modulating device of the second embodiment can be used advantageously when the specimen is, for example, a biological specimen which changes over time.

According to a modified example, a beam splitter or a half-silvered mirror may be used instead of the polarization beam splitter 17.

According to another modified example, the spatial light modulating device 16 may be constructed from a transmissive liquid crystal device having independent transparent electrodes, one for each of a plurality of pixels arranged in a two-dimensional array, on at least one side of a liquid crystal layer. In this case, the illumination light enters the spatial light modulating device 16 along the optical axis OA. The diffracted light generated by the spatial light modulating device 16 emerges from the side opposite to the illumination light incident side, i.e., from the side that faces the shutter 18. In this modified example, the polarization beam splitter may be omitted.

According to a further modified example, in the optical modulating device of the second embodiment also, the polarization plane rotating device may be constructed as an azimuth polarization converting device.

As described above, any person skilled in the art can make various modifications suited to any specific embodiment without departing from the scope of the present invention.

DESCRIPTION OF THE REFERENCE NUMERALS

100 . . . MICROSCOPE APPARATUS
101 . . . LIGHT SOURCE
102, 104 . . . COLLIMATOR
103, 103' . . . LIGHT MODULATING DEVICE
105 . . . BEAM SPLITTER
106 . . . OBJECTIVE LENS
107 . . . CONDENSING LENS
108 . . . LIGHT RECEIVING DEVICE
109 . . . CONTROLLER
10, 10' . . . SELECTIVE DIFFRACTION DEVICE
11 . . . DIFFRACTION GRATING
12 . . . SHUTTER
121 . . . LIQUID CRYSTAL DEVICE
122 . . . ANALYZER
13 . . . PHASE MODULATING DEVICE
131, 132 . . . LIQUID CRYSTAL DEVICE
14 . . . POLARIZATION PLANE ROTATING DEVICE
141, 142 . . . LIQUID CRYSTAL DEVICE
15 . . . AZIMUTH POLARIZATION CONVERTING DEVICE
16 . . . SPATIAL LIGHT MODULATING DEVICE
17 . . . POLARIZATION BEAM SPLITTER
18 . . . SHUTTER
181 . . . LIQUID CRYSTAL DEVICE
182 . . . ANALYZER
20 . . . LIQUID CRYSTAL LAYER
20a to 20g, 30a to 30g, 80a to 80f . . . SUB-REGION
21, 22 . . . TRANSPARENT SUBSTRATE
23, 24 . . . TRANSPARENT ELECTRODE
25, 26 . . . ALIGNMENT FILM
27 . . . LIQUID CRYSTAL MOLECULE
28 . . . SEALING MEMBER
29 . . . MIRROR FRAME

The invention claimed is:

1. A light modulating device comprising:
a selective diffraction device which generates diffracted light beams of a plurality of orders by diffracting illumination light into one of a plurality of directions, the illumination light being linearly polarized light having a polarization plane oriented in a first polarization direction, and which causes a phase difference between the diffracted light beams of the plurality of orders;
a polarization plane rotating device which rotates the polarization plane of the diffracted light beams of the plurality orders so as to be oriented in a direction perpendicular to a direction radiating from an optical axis; and
a controller,
wherein the selective diffraction device includes:
a diffractive device which diffracts the illumination light into the plurality of directions;
a shutter device through which the diffracted light beams of the plurality of orders diffracted in the one of the plurality of directions are allowed to pass; and
a phase modulating device which includes at least one first liquid crystal device for causing a phase difference between the diffracted light beams of the plurality of orders passed through the shutter device, each of the at least one first liquid crystal device including a first liquid crystal layer on which the diffracted light beams of the plurality of orders passed through the shutter device are incident,
wherein the shutter device includes:
a second liquid crystal device which includes a second liquid crystal layer; and
an analyzer which is disposed nearer the phase modulating device than the second liquid crystal device is, and which allows linearly polarized light having a polarization plane oriented in a second polarization direction among the diffracted light beams passing through the second liquid crystal device to pass through, while blocking linearly polarized light having a polarization plane oriented in a direction other than the second polarization direction among the diffracted light beams passing through the second liquid crystal device, and wherein:
the second liquid crystal layer contains liquid crystal molecules aligned in a direction that bisects an angle that the first polarization direction makes with the second polarization direction, and
the shutter device allows the diffracted light beams of the plurality of orders diffracted in the one of the plurality of directions to pass through by applying a predetermined voltage in response to the wavelength of the illumination light across a sub-region of the second liquid crystal layer through which the diffracted light beams pass, to rotate the polarization plane of the diffracted light beams passing through the sub-region so as to be oriented in parallel to the second polarization direction, and wherein the controller changes the sub-region of the second liquid crystal layer to which the predetermined voltage is applied when the one of the plurality of directions is changed.

2. The light modulating device according to claim 1, wherein the first liquid crystal layer contains liquid crystal molecules aligned in parallel with the polarization direction of the diffracted light beams of the plurality of orders passed through the shutter device, and wherein
a phase difference proportional to a difference between a first voltage applied to a first sub-region of the first liquid crystal layer through which a diffracted light beam of a first order among the diffracted light beams of the plurality of orders passes and a second voltage applied to a second sub-region of the first liquid crystal layer through which a diffracted light beam of a second order among the diffracted light beams of the plurality of orders passes is caused between the diffracted light beam of the first order and the diffracted light beam of the second order.

3. The light modulating device according to claim 1, wherein the phase modulating device includes two liquid crystal devices, each as the first liquid crystal device, which are arranged along the optical axis, and wherein
the first liquid crystal layer in each of the two first liquid crystal devices is chosen to have a thickness such that a maximum value of an optical path length difference that occurs between the diffracted light beam of the first order and the diffracted light beam of the second order while passing through the first liquid crystal layer is less than the wavelength of the illumination light.

4. The light modulating device according to claim 1, wherein the polarization plane rotating device includes a third liquid crystal device which includes a third liquid crystal layer which contains liquid crystal molecules aligned in a direction that bisects an angle that the polarization plane of the diffracted light beams of the plurality of orders emitted from the selective diffraction device makes with the direction perpendicular to the radiating direction, and wherein
when a predetermined voltage proportional to the wavelength of the illumination light is applied across the third liquid crystal layer in the third liquid crystal device, the polarization plane of the diffracted light beams of the plurality of orders passing through the third liquid crystal layer is rotated so as to be oriented in the direction perpendicular to the radiating direction.

5. The light modulating device according to claim 1, wherein the polarization plane rotating device includes an azimuth polarization converting device by which linearly polarized light having a polarization plane parallel to the polarization plane of the diffracted light beams of the plurality of orders emitted from the selective diffraction device is converted into azimuthally polarized light.

6. A light modulating device comprising:
a selective diffraction device which generates diffracted light beams of a plurality of orders by diffracting illumination light into one of a plurality of directions, the illumination light being linearly polarized light having a polarization plane oriented in a first polarization direction, and which causes a phase difference between the diffracted light beams of the plurality of orders; and
a polarization plane rotating device which rotates the polarization plane of the diffracted light beams of the plurality orders so as to be oriented in a direction perpendicular to a direction radiating from an optical axis; and
a controller,
wherein the selective diffraction device includes:
a first liquid crystal device which displays a diffraction grating for diffracting the illumination light into a selected one of the plurality of directions and for causing a phase difference between the diffracted light beams of the plurality of orders, the first liquid crystal device including a first liquid crystal layer on which the illumination light is incident; and
a shutter device which the diffracted light beams of the plurality of orders diffracted in the selected one of the plurality of directions are allowed to pass, wherein the shutter device includes:
a second liquid crystal device which includes a second liquid crystal layer; and
an analyzer which is disposed nearer the phase modulating device than the second liquid crystal device is, and which allows linearly polarized light having a polarization plane oriented in a second polarization direction among the diffracted light beams passing through the second liquid crystal device to pass through, while blocking linearly polarized light having a polarization plane oriented in a direction other than the second polarization direction among the diffracted light beams passing through the second liquid crystal device, and wherein:
the second liquid crystal layer contains liquid crystal molecules aligned in a direction that bisects an angle that the first polarization direction makes with the second polarization direction, and
the shutter device allows the diffracted light beams of the plurality of orders diffracted in the selected one of the plurality of directions to pass through by applying a predetermined voltage in response to the wavelength of the illumination light across a sub-region of the second liquid crystal layer through which the diffracted light beams pass, to rotate the polarization plane of the diffracted light beams passing through the sub-region so as to be oriented in parallel to the second polarization direction, and wherein
the controller changes the sub-region of the second liquid crystal layer to which the predetermined voltage is applied when the selected one of the plurality of directions is changed.

* * * * *

UNITED STATES PATENT AND TRADEMARK OFFICE
CERTIFICATE OF CORRECTION

| | | |
|---|---|---|
| PATENT NO. | : 9,772,484 B2 | Page 1 of 1 |
| APPLICATION NO. | : 14/647403 | |
| DATED | : September 26, 2017 | |
| INVENTOR(S) | : Kenji Matsumoto et al. | |

It is certified that error appears in the above-identified patent and that said Letters Patent is hereby corrected as shown below:

In the Claims

Column 24, Line 21, after the word "device" and before the word "which", insert the word --through--.

Column 24, Line 27, replace "phase modulating" with --polarization plane rotating--.

Signed and Sealed this
Tenth Day of April, 2018

Andrei Iancu
*Director of the United States Patent and Trademark Office*